United States Patent
Zhao et al.

(10) Patent No.: US 12,066,835 B2
(45) Date of Patent: Aug. 20, 2024

(54) FLEET MANAGEMENT USER INTERFACE

(71) Applicant: Lyft, Inc., San Francisco, CA (US)

(72) Inventors: Emily Zhao, New York, NY (US); Linwe Chen, New York, NY (US); Amalia Nicole Viti, New York, NY (US); Carl Richardson Nelson, Brooklyn, NY (US); Samuel Hu, Nanuet, NY (US); David Keith Bromwich, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 834 days.

(21) Appl. No.: 16/716,427

(22) Filed: Dec. 16, 2019

(65) Prior Publication Data

US 2021/0181762 A1 Jun. 17, 2021

(51) Int. Cl.
  *G05D 1/00* (2024.01)
  *G08G 1/00* (2006.01)

(52) U.S. Cl.
  CPC ......... *G05D 1/0291* (2013.01); *G05D 1/0088* (2013.01); *G08G 1/202* (2013.01)

(58) Field of Classification Search
  CPC ............... G05D 1/0291; G05D 1/0088; G05D 2201/0213; G08G 1/202; G08G 1/205
  See application file for complete search history.

(56) References Cited

U.S. PATENT DOCUMENTS

| | | | |
|---|---|---|---|
| 11,164,121 B1* | 11/2021 | Snider | G06Q 10/063118 |
| 2006/0217856 A1* | 9/2006 | DeBoard | G06Q 10/109 |
| | | | 702/178 |
| 2013/0346981 A1* | 12/2013 | Johnson | G06Q 10/109 |
| | | | 718/100 |
| 2015/0193849 A1* | 7/2015 | Bubulj | G06Q 40/08 |
| | | | 705/26.4 |
| 2016/0377445 A1* | 12/2016 | Rodoni | G01C 21/362 |
| | | | 701/428 |
| 2017/0278312 A1* | 9/2017 | Minster | G05D 1/0297 |
| 2018/0252542 A1* | 9/2018 | Bruni | G06Q 10/06398 |

* cited by examiner

*Primary Examiner* — Aaron L Troost
(74) *Attorney, Agent, or Firm* — Baker Botts L.L.P.

(57) ABSTRACT

Techniques are disclosed for fleet vehicle management. According to various embodiments, a status is determined for each fleet vehicle of a plurality of fleet vehicles. Based on the status, a service task is determined for at least a subset of the plurality of fleet vehicles. A location is determined for each service task. A service task list is generated based on the service tasks and the locations of the service tasks. A user to perform the service task list is determined based on the service tasks and the service task locations. The service task is communicated to the user and progress of the service task list is monitored.

20 Claims, 18 Drawing Sheets

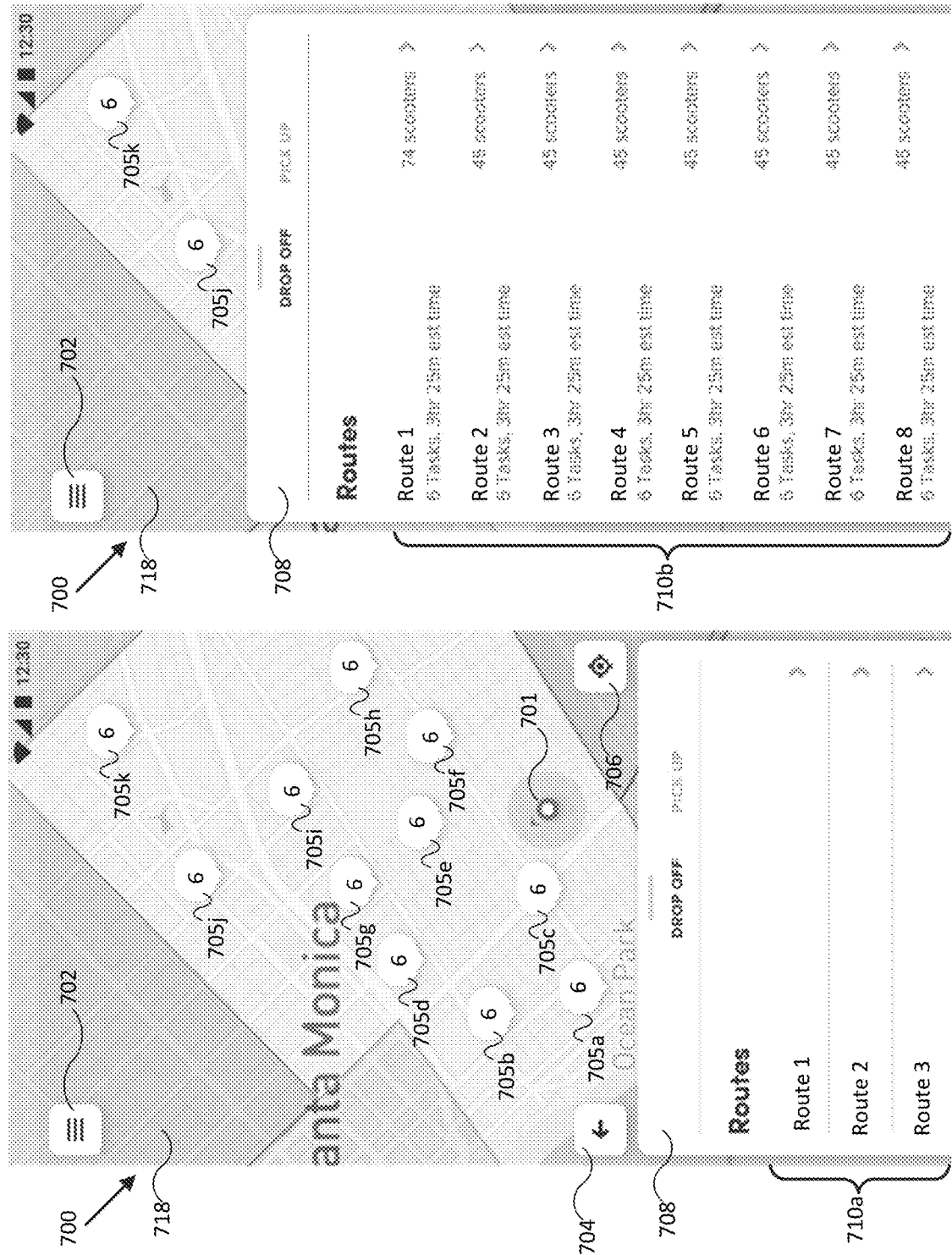

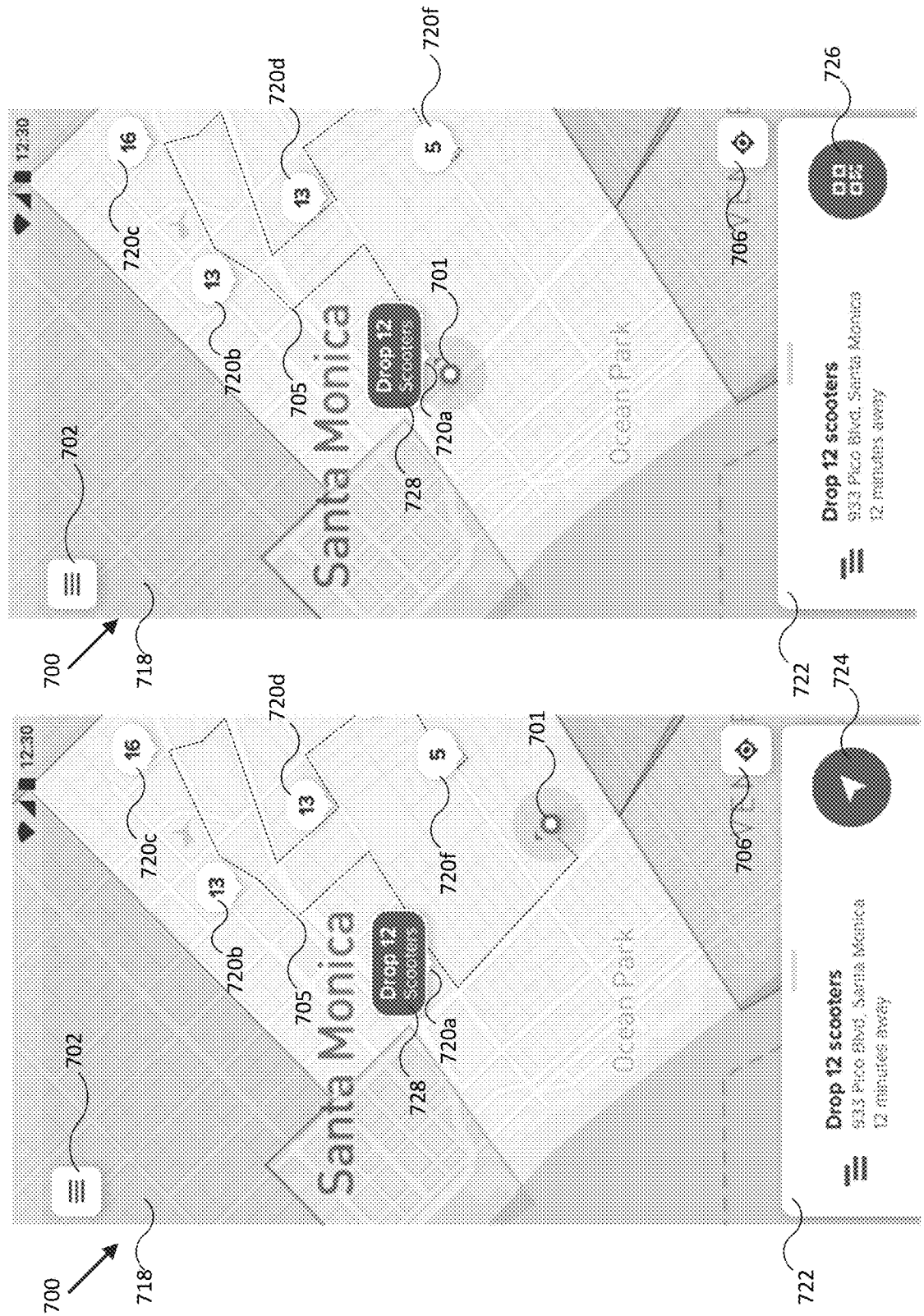

FLEET MANAGEMENT USER INTERFACE

TECHNICAL FIELD

One or more embodiments of the present disclosure relate generally to fleet vehicles and more particularly, to an automated platform that determines when, where, and how to service fleet vehicles.

BACKGROUND

Transportation options in urban environments generally include busses, rail vehicles such as subways or trolleys, cars, vans, trucks, taxis, bicycles, skateboards, and walking More recently, shareable/rentable vehicles including scooters and bicycles have become more common in urban environments, improving transportation access and allowing users additional options for traveling. These shareable/rentable vehicles require servicing to maintain functionality and meet user demand. For example, a vehicle may need a battery service or a tire service to further serve as a shareable/rentable vehicle. Managing service tasks for a large vehicle fleet deployed in operation is labor intensive and oftentimes impractical as the fleet vehicles may be rented and moved around the urban environment. Conventional fleet management systems and methods do not gather or utilize the large amounts of data associated with real-time operations of shareable/rentable vehicles. There is a need to improve upon fleet vehicle management technology by implementing an automated platform that allows for dynamic service scheduling using real-time data to increase productivity and efficiency in servicing fleet vehicles.

SUMMARY

Techniques are disclosed for fleet vehicle management. According to various embodiments, a system may determine a status for each fleet vehicle of a plurality of fleet vehicles. Based on the status, the system may determine a service task for at least a subset of the plurality of fleet vehicles. The system may determine a location for each service task. The system may generate a service task list based on the service tasks and the locations of the service tasks. The system may further determine a user to perform the service task list based on the service tasks and the service task locations. The system may communicate the service task to the user and monitor progress of the service task list, such as through user inputs or real-time data sent through the fleet vehicle.

According to one or more embodiments, a non-transitory machine-readable medium may include a plurality of machine-readable instructions which when executed by one or more processors are adapted to cause the one or more processors to perform a method. The method may include receiving, by a user device, a service task list that has one or more service tasks. The method may further include determining a location of the user device. Based on the location of the user device, an order of service tasks in the service task list may be arranged to provide a navigation route having route legs that connect adjacent tasks in the service task list. The method may include displaying the service task list in a graphical user interface in a display screen of a user device.

The scope of the invention is defined by the claims, which are incorporated into this section by reference. A more complete understanding of embodiments of the invention will be afforded to those skilled in the art, as well as a realization of additional technological advantages thereof, by a consideration of the following detailed description of one or more embodiments. Reference will be made to the appended sheets of drawings that will first be described briefly.

BRIEF DESCRIPTION OF THE DRAWINGS

FIGS. 7A-7G illustrate a graphical user interface rendered by a display in accordance with an embodiment of the disclosure.

Embodiments of the present disclosure and their technological advantages are best understood by referring to the detailed description that follows. It should be appreciated that like reference numerals are used to identify like elements illustrated in one or more of the figures.

DETAILED DESCRIPTION

Figure 1:
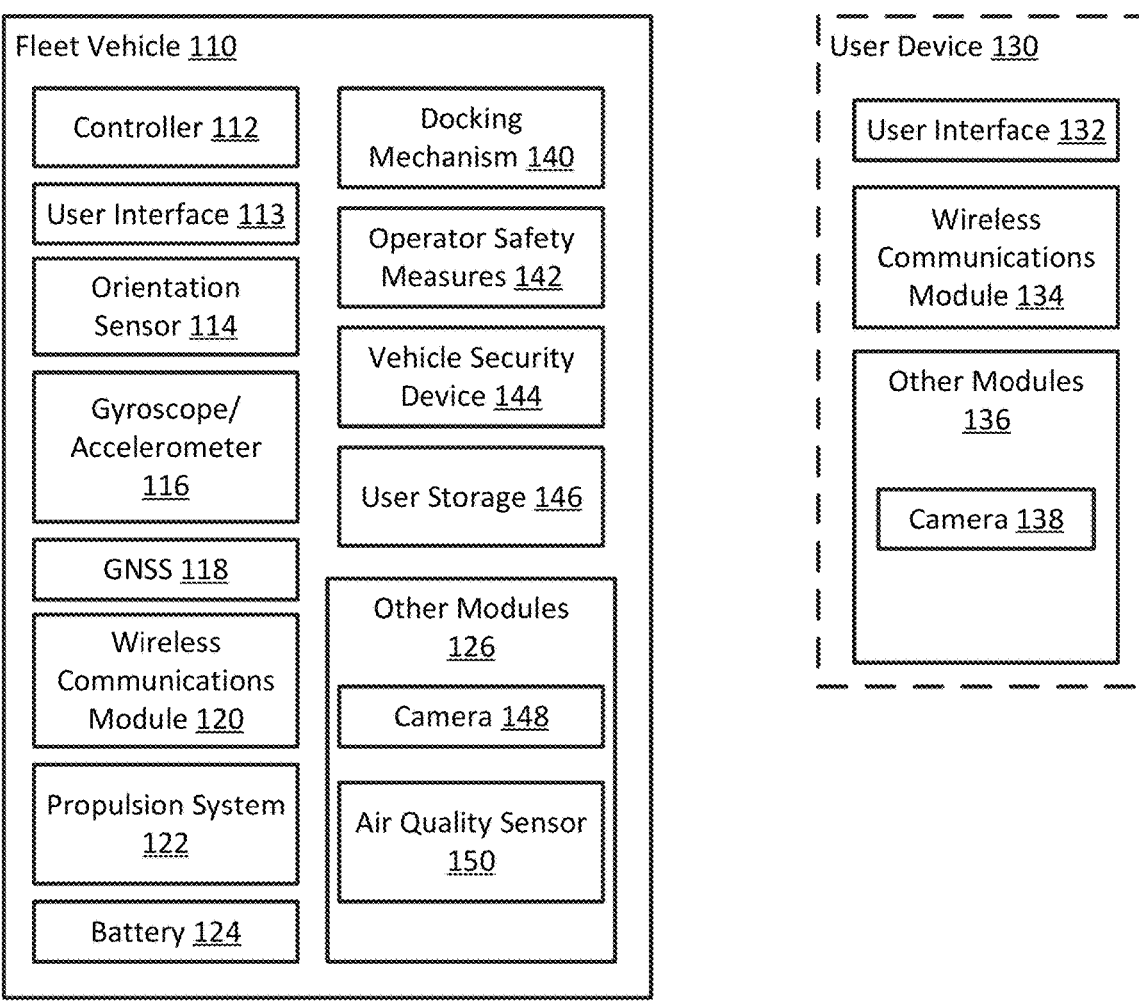
FIG. 1 illustrates a block diagram of a portion of a dynamic transportation matching system including a fleet vehicle in accordance with an embodiment of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Fleet vehicles, such as battery-powered stand-scooters, bicycles, and sit-scooters, typically need to be serviced in the field periodically. The present disclosure describes systems and methods for automated fleet vehicle management that allow for service schedules (e.g., service task lists) to be generated and monitored according to various embodiments.

In some embodiments, a fleet vehicle management system determines a status for each of a plurality of fleet vehicles. A status of a fleet vehicle may include a hardware/software status (e.g., battery status, tire status, controller status), a location status, and/or an operation status (e.g., active, non-active, standby). Based on the status of the fleet vehicles, the system may determine a service task for at least a subset of the fleet vehicles. A service task may include inspecting the fleet vehicle, replacing a battery or other component of the fleet vehicle, retrieving and/or replacing the fleet vehicle (e.g., for more extensive maintenance or relocation), and/or deploying the fleet vehicle at a specific location to make the fleet vehicle available for operation. In some instances, machine learning models may be used to recommend the service task based on learned training datasets including historic information related to service tasks.

In some embodiments, the system determines a location for each of the service tasks. For example, a service task location may be a geolocation of the fleet vehicle that will be serviced. In other examples, the service task location may include one or more locations corresponding to a geolocation where a fleet vehicle is to be retrieved and a geolocation where the fleet vehicle is to be relocated or deployed. Machine learning models may be used to predict deployment locations where there will be a demand for fleet vehicles. In such cases, the machine learning model predictions may be employed in automatic generation of service tasks with specified deployment locations.

The system may determine a user (e.g., fleet vehicle field technician) to perform the service task list according to an embodiment. In an aspect, the user may be determined based, at least in part, on the service tasks and corresponding service task locations. For example, a user assigned to fleet vehicle deployment services may be assigned service tasks that are of a deployment service type. As another example, a user that is closest in proximity to one or more of the service task locations may be prioritized over other users in determining a user to perform the task list. That is, the system may prioritize users based on proximity to one or more service task locations to determine a user to perform the service task list. In some instances, the user's location may be determined based on a geolocation of a computing device associated with the user.

According to various embodiments, a user (e.g., fitting a specific user profile) may be assigned to the service task list. For example, the user may be assigned automatically by the system or the user may accept the service task list, which may cause the assignment of the service task list to the user. In an embodiment, the system may communicate the service task list to a computing device associated with the user. In some embodiments, the communication of the service task list to the computing device may cause the computing device to display the service task list in a display screen of the computing device.

In accordance with one or more embodiments, the system may monitor a progress of the service task list. For example, as the user performs each of the service tasks in the service task list, a progress of the service task list may be monitored and updated in real-time. Service task updates may be determined based on received status updates from fleet vehicles associated with service tasks in the service task list, status updates from the computing device associated with the user, such as through user inputs, and/or a combination thereof. In some cases, the system may cause a visual indication of the progress of the service task list to display in a fleet vehicle service management device. Due to a limited screen size of the fleet vehicle service management device, various graphical user interface elements may be displayed and various operations may be performed as described herein to optimize display screen utilization as well as provide for a user-friendly and convenient user interface.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLO-NASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
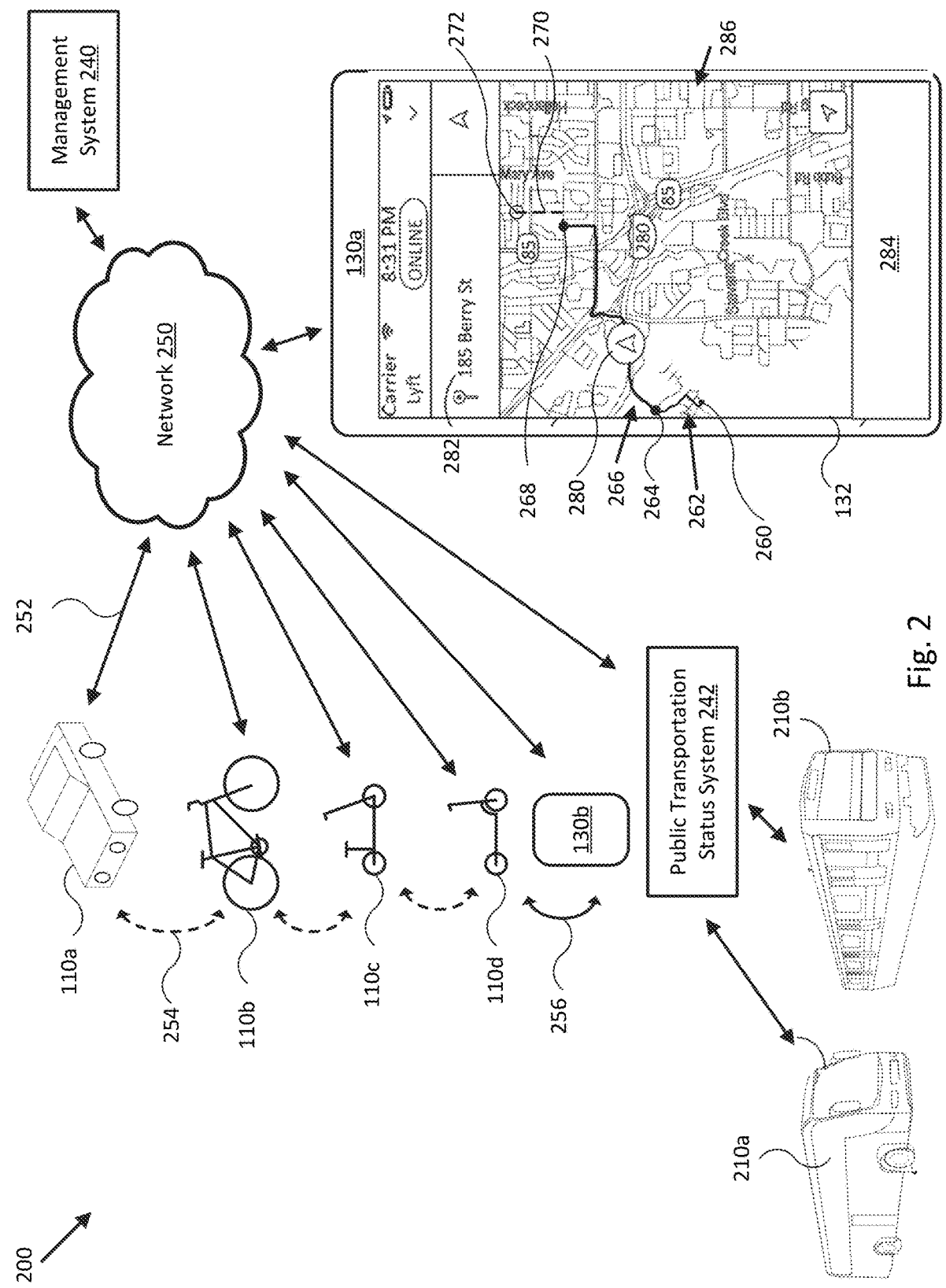
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to hire or rent one of fleet vehicles 110a-d by transmitting a transportation request to management system 240 over WAN 250, allowing management system 240 to poll status of fleet vehicles 110a-d and to select one of fleet vehicles 110a-d to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130b, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110*a-d*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110*a-d*, as described herein.

User device 130*a* in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110*b*, 110*c*, or 110*d*) from bus stop 268 to destination 272. Also shown rendered by user interface 132 are present location indicator 280 (indicating a present absolute position of user device 130*a* on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130*a*, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
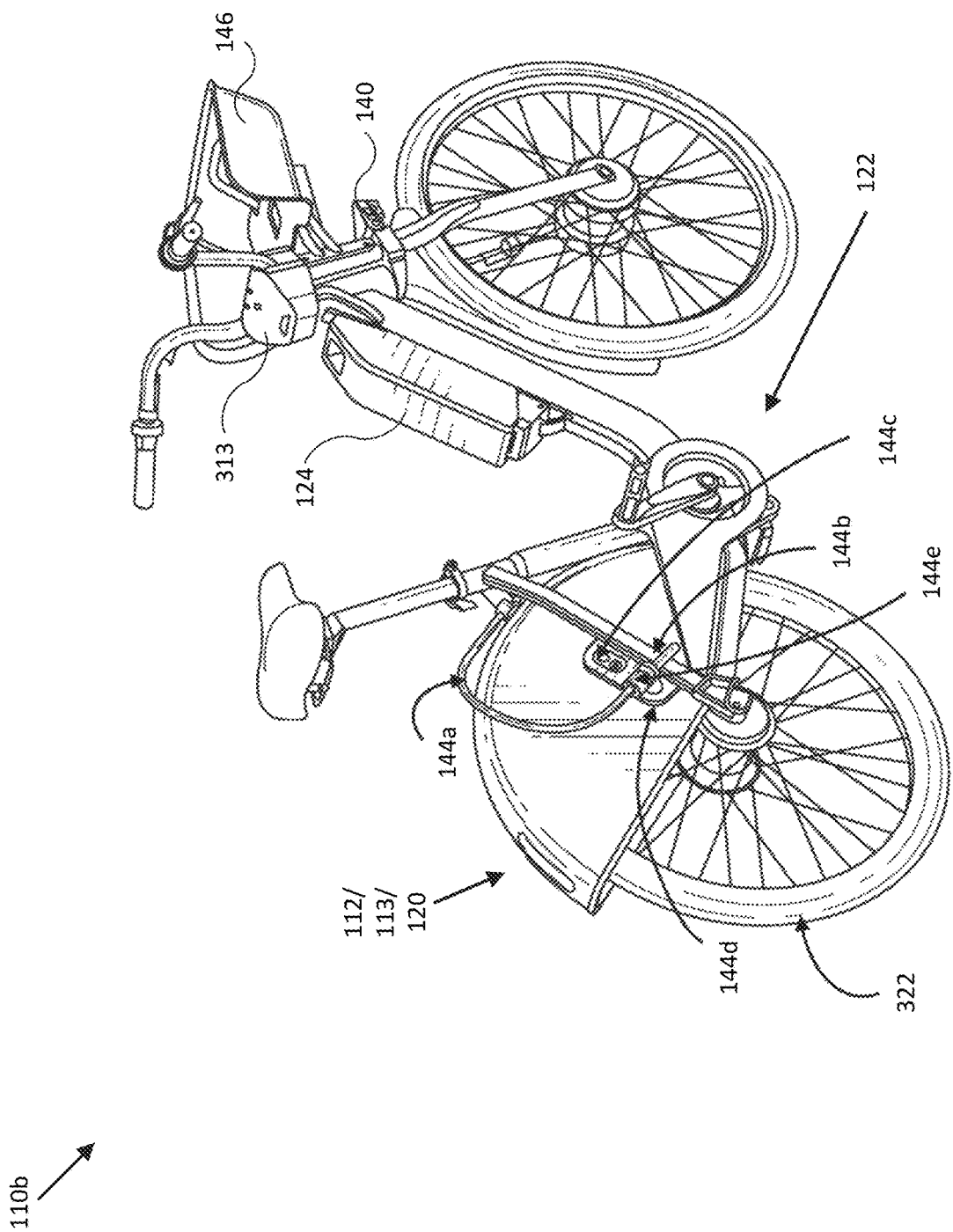
FIGS. 3A-C illustrate diagrams of micro-mobility fleet vehicles for use in a dynamic transportation matching system in accordance with embodiments of the disclosure.
Figure 3B:
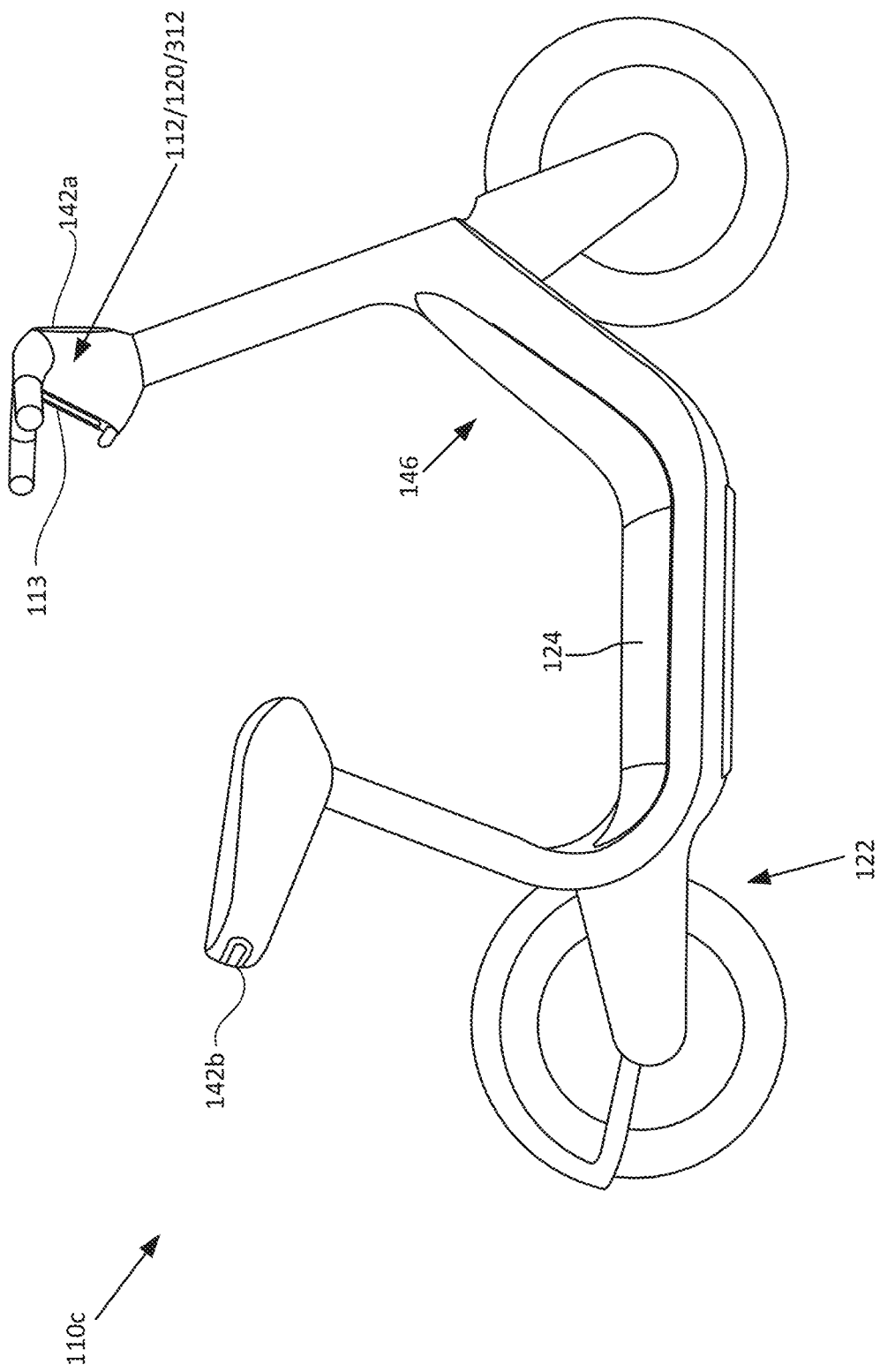
Figure 3C:
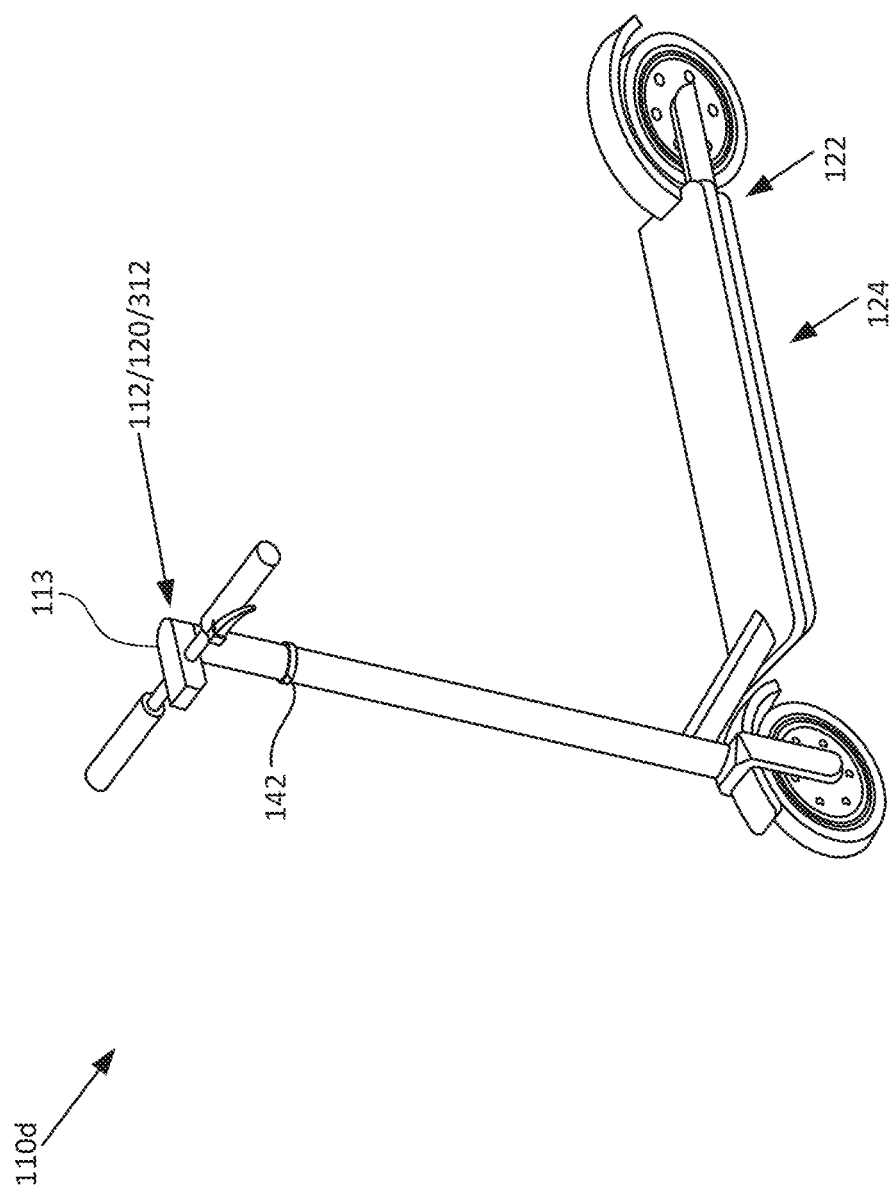

FIGS. 3A-C illustrate diagrams of micro-mobility fleet vehicles 110*b*, 110*c*, and 110*d*, which may be integrated with mobile mesh network provisioning systems in accordance with an embodiment of the disclosure. For example, fleet vehicle 110*b* of FIG. 3A may correspond to a motorized bicycle for hire that is integrated with the various elements of system 100 and may be configured to participate in dynamic transportation matching system 200 of FIG. 2. As shown, fleet vehicle 110*b* includes controller/user interface/wireless communications module 112/113/120 (e.g., integrated with a rear fender of fleet vehicle 110*b*), propulsion system 122 configured to provide motive power to at least one of the wheels (e.g., a rear wheel 322) of fleet vehicle 110*b*, battery 124 for powering propulsion system 122 and/or other elements of fleet vehicle 110*b*, docking mechanism 140 (e.g., a spade lock assembly) for docking fleet vehicle 110*b* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize fleet vehicle 110*b* by default, thereby requiring a user to transmit a hire request to management system 240 (e.g., via user device 130) to hire fleet vehicle 110*b* before attempting to use fleet vehicle 110*b*. The hire request may identify fleet vehicle 110*b* based on an identifier (e.g., a QR code, a barcode, a serial number, etc.) presented on fleet vehicle 110*b* (e.g., such as by user interface 113 on a rear fender of fleet vehicle 110*b*). Once the hire request is approved (e.g., payment is processed), management system 240 may transmit an unlock signal to fleet vehicle 110b (e.g., via network 250). Upon receiving the unlock signal, fleet vehicle 110b (e.g., controller 112 of fleet vehicle 110b) may release vehicle security device 144 and unlock rear wheel 322 of fleet vehicle 110b.

Fleet vehicle 110c of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110c includes many of the same elements as those discussed with respect to fleet vehicle 110b of FIG. 3A. For example, fleet vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Fleet vehicle 110d of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110d includes many of the same elements as those discussed with respect to fleet vehicle 110b of FIG. 3A. For example, fleet vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 4:
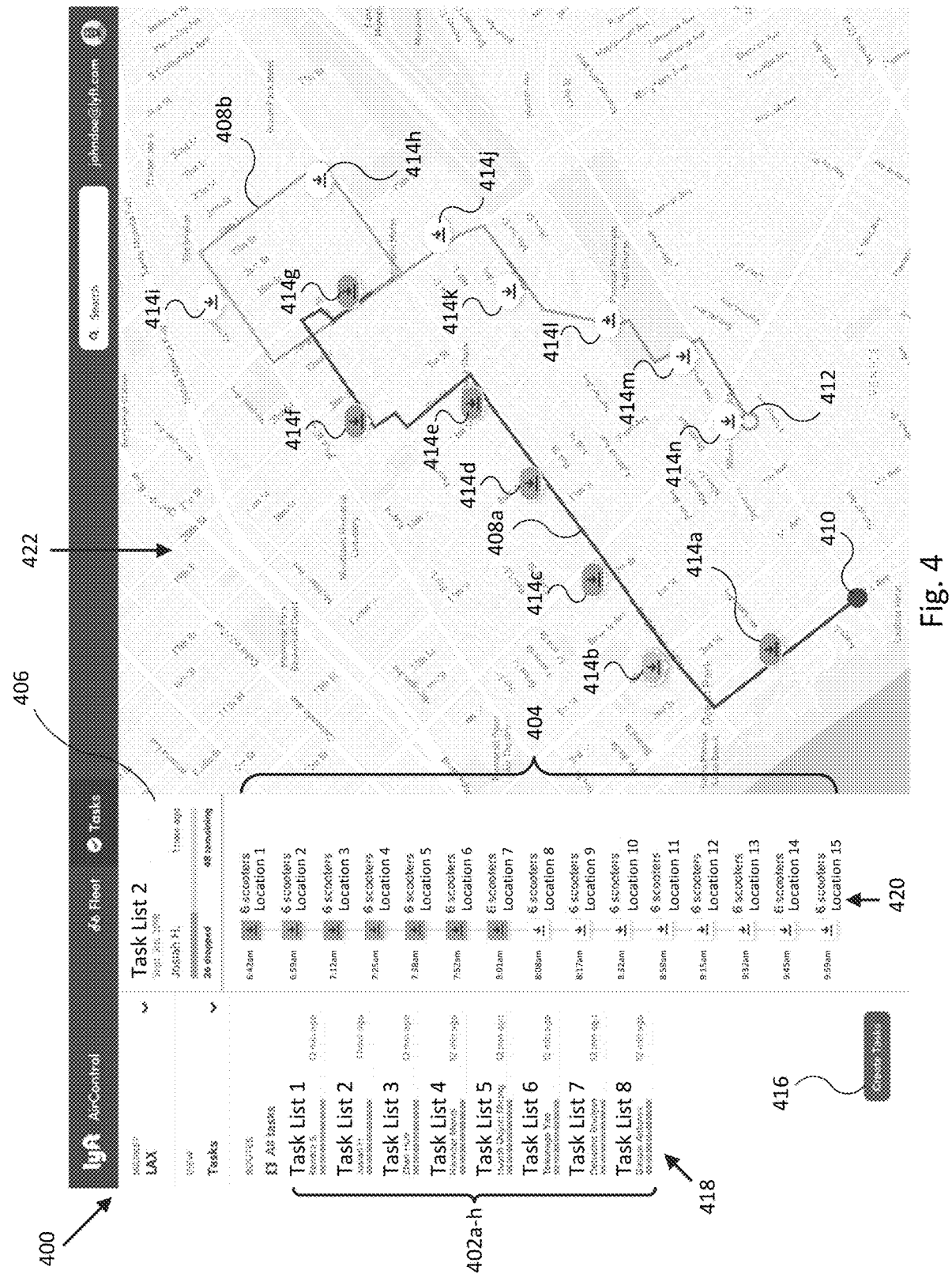
FIG. 4 illustrates a graphical user interface rendered by a display in accordance with an embodiment of the disclosure.

FIG. 4 illustrates a graphical user interface 400 rendered by a display of a user device (e.g., fleet management device) in accordance with an embodiment of the present disclosure. In the embodiment shown in FIG. 4, user interface 400 includes a plurality of task lists 402a-h, task list progress 404, user profile 406, and task map 422.

The plurality of task lists 402a-h may be displayed in user interface 400 such that each of the task lists may be selected. Selecting a task list in the plurality of task lists 402a-h may cause details of the selected task list to display in another portion of user interface 400. For example, the details may be displayed in a portion of user interface 400 that expands from the task list. In the embodiment shown in FIG. 4, selection of Task List 2 in the plurality of task lists 402a-h may cause task list progress 404 to expand from the plurality of task list 402a-h in an adjacent portion of user interface 400.

Task list progress 404 may be a graphical display of a current progress of Task List 2. Task list progress 404 may include a listing of each individual service task in Task List 2 and a graphical indicator 420 that shows a current status of the task. In some embodiments, graphical indicator 420 may include a time, a task location, a service type, and/or a status indicator. Other content that can be displayed include a time required for the task to be completed and an estimated amount of time to complete the task.

For example, the time may be an allotted time budget for the task, a target time to complete the task, an actual time that was used to complete the task, an estimated time to complete the task based on historic times recorded for similar or same tasks, and/or an estimated time until the task location is reached based on absolute positions of a fleet technician device, the task location, traffic conditions, etc.

For example, the task location may be a street address, latitude and longitude geocoordinates, and/or location by reference (e.g., near the rear entrance of the library, adjacent to the pathway near the dog park, next to the barbershop building, near sign designating fleet vehicle location, etc.).

For example, the service type may be an indication of a service to be performed for the task. Types of services may include inspecting a fleet vehicle, replacing/recharging a battery pack for a fleet vehicle, retrieving and/or replacing a fleet vehicle (e.g., for maintenance, charging, relocation, inspection), and/or providing (e.g., deploying) a fleet vehicle.

For example, the status indicator (depicted as a downward facing arrow above a horizontal line in task list progress 404) may provide a visual indication of a task status corresponding to a task. As a further example, the task status may correspond to a status of complete, incomplete, in-progress, skipped, needs review, has an issue, overdue, urgent, causing delay, etc. In various embodiments, each status may correspond to a different color and the status indicator may be configured to display the color in a color indicator. To illustrate, a status of complete may correspond to a "green" color; a status of incomplete may correspond to a "white" color; a status of in-progress may correspond to a "yellow" color; a status of overdue may correspond to a "red" color; etc. Status indicators may also or alternatively be displayed in different size font or different intensities to enable the user to more easily determine task statuses.

In some embodiments, each of the task lists in the plurality of task lists 402a-h may have a respective graphical indicator (e.g., graphical indicator 418) that may be a scaled-down version (e.g., preview) of a task list progress for the task. For example, the graphical indicator 418 may display a task list progress bar with segmented color indicators corresponding to the progress of each task for that task list. Graphical indicator 418 may further have an indication of a user profile assigned to a particular task list. For example, as shown in FIG. 4, "Kendra S" is assigned to Task List 1, "Josiah H" is assigned to Task List 2, "Zhan Huo" is assigned to Task List 3, etc.

According to some embodiments, selection of Task List 2 from task lists 402a-h may cause user profile 406 to display in a portion of user interface 400. User profile 406 may be a user profile to which Task List 2 has been assigned. User profile 406 may have a task list progress indicator that shows a current progress of the task list (e.g., progress bar). In the embodiment shown in FIG. 4, "Josiah H" is dropping off scooters as part of the service tasks in Task List 2 and has dropped off 26 with 48 remaining to be dropped off. In some embodiments, the task list progress indicator may show a current progress of one or more other types of tasks. For example, a current progress related to a number of batteries replaced, fleet vehicles inspected, and fleet vehicles retrieved or relocated may be displayed concurrently. The task list progress indicator may further display a time indication associated with the task list. For example, the time indication may be a time remaining to complete the task list, a time since the last task in the task list was completed, a time since the task list was last updated and/or other various time indications discussed above related to tasks.

In some embodiments, selection of Task List 2 from task lists 402a-h may cause task map 422 to display in user interface 400. Task map 422 may be one of a plurality of task maps, where each task map corresponds to a task list in task lists 402a-h. Selecting different tasks from task lists 402a-h may cause corresponding task maps to populate in a portion of user interface 400. As shown in FIG. 4, task map 422 may be a graphical display of Task List 2 in a navigational map.

Task map 422 may include one or more tasks in Task List 2 and a route indicator corresponding to Task List 2.

In some embodiments, the route indicator may have a plurality of route legs that may be visually different to indicate different aspects of a navigational route. For example, the route indicator may have a route leg 408a that is visually different than route leg 408b. As a further example, route leg 408a may be visually represented as a darker shade than route leg 408b to indicate that tasks corresponding to task locations along route leg 408a have been completed while tasks corresponding to task locations along route leg 408b are yet to be completed. In one or more embodiments, a route leg may be a color that corresponds to a type of task that is to be completed at the end of the route leg. For example, a route leg may be a "blue" color to indicate deployment, an "orange" color to indicate inspection, a "purple" color to indicate battery replacement, etc.

In one or more embodiments, the route indicator may be a preferred navigational route beginning from a location 410 associated with user profile 406 and connecting each of the task locations in Task List 2 along a continuous navigational route. In this regard, each of task locations 414a-n may be on the navigational route. The route indicator may have an end location 412 at final task location 414n. In one or more embodiments, each task location may be indicated in task map 422 by a task status indicator similar to the status indicator discussed above in reference to Task list progress 404. If conditions change, such as to any specific fleet vehicle or task, content presented on the user interface may change in real-time, such as by deleting one or more tasks, changing one or more tasks, changing one or more leg routes, and/or adding a location and/or a task.

Thus, user interface 400 can provide an improved display system that allows for a user to be able to adaptively navigate between task lists and efficiently monitor individual task progress in a display screen with limited available display space.

Figure 5A:
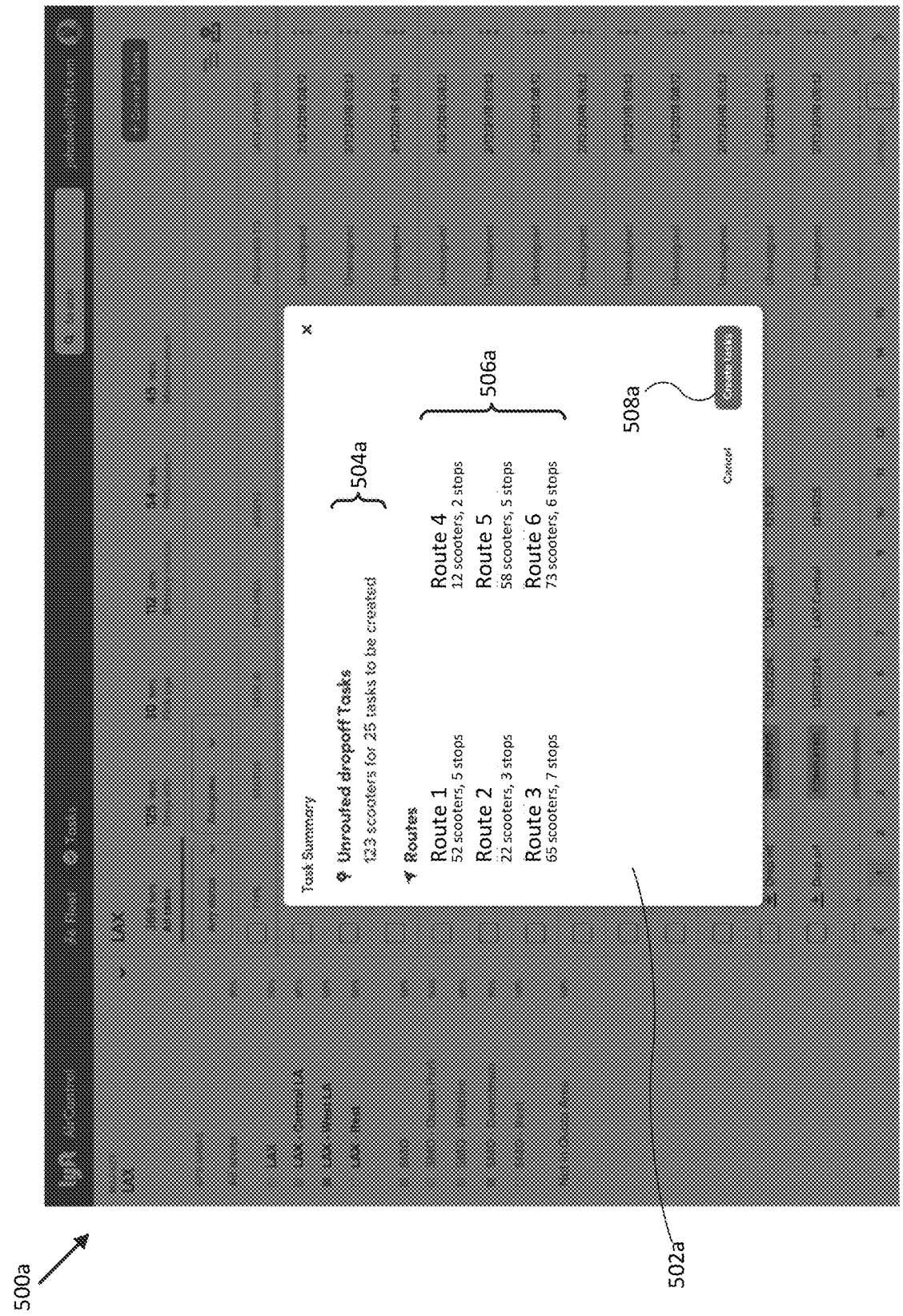
FIGS. 5A and 5B illustrate a graphical user interface rendered by a display in accordance with an embodiment of the disclosure.

FIG. 5A illustrates a user interface 500a rendered by a display of a user device in accordance with an embodiment of the present disclosure. In the embodiment shown in FIG. 5A, user interface 500a includes a task summary 502a. Task summary 502a may include a detail summary 504a and a detail summary 506a. Detail summary 504a may include a summary of unassigned tasks (e.g., tasks that have not been assigned to a task list or task route, number of scooters requiring servicing, and/or tasks to be generated). A create tasks button 508a may be used to generate new tasks from the unassigned tasks in detail summary 504a. In various embodiments, new tasks are automatically generated and assigned to task lists and/or user profiles without use of the create tasks button 508a. Detail summary 506a may include a summary of task routes that may be assigned to task lists or specific user profiles and/or fleet vehicles, identified by an identifier, that require servicing.

Figure 5B:
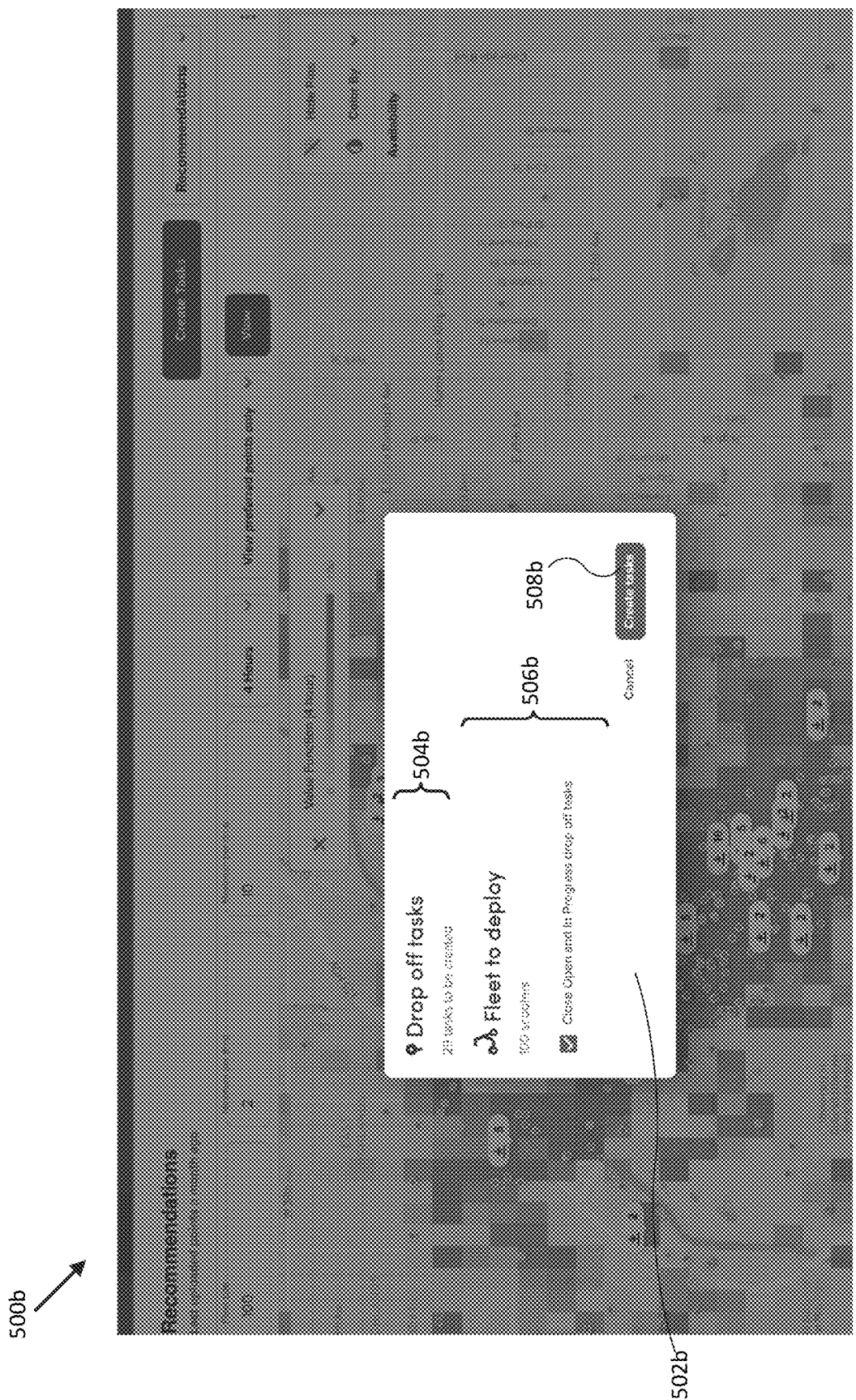

FIG. 5B illustrates a user interface 500b rendered by a display of a user device in accordance with an embodiment of the present disclosure. In the embodiment shown in FIG. 5B, user interface 500b includes a task summary 502b. Task summary 502b may include a detail summary 504b and a detail summary 506b. Detail summary 504b may include a summary of unassigned tasks (e.g., tasks that have not been assigned to a task list or task route, number of scooters requiring servicing, and/or tasks to be generated). A create tasks button 508b may be used to generate new tasks from the unassigned tasks in detail summary 504b. In various embodiments, new tasks are automatically generated and assigned to task lists and/or user profiles without use of the create tasks button 508b. Detail summary 506b may include a summary of fleet vehicles, identified by an identifier, that require servicing.

Figure 6:
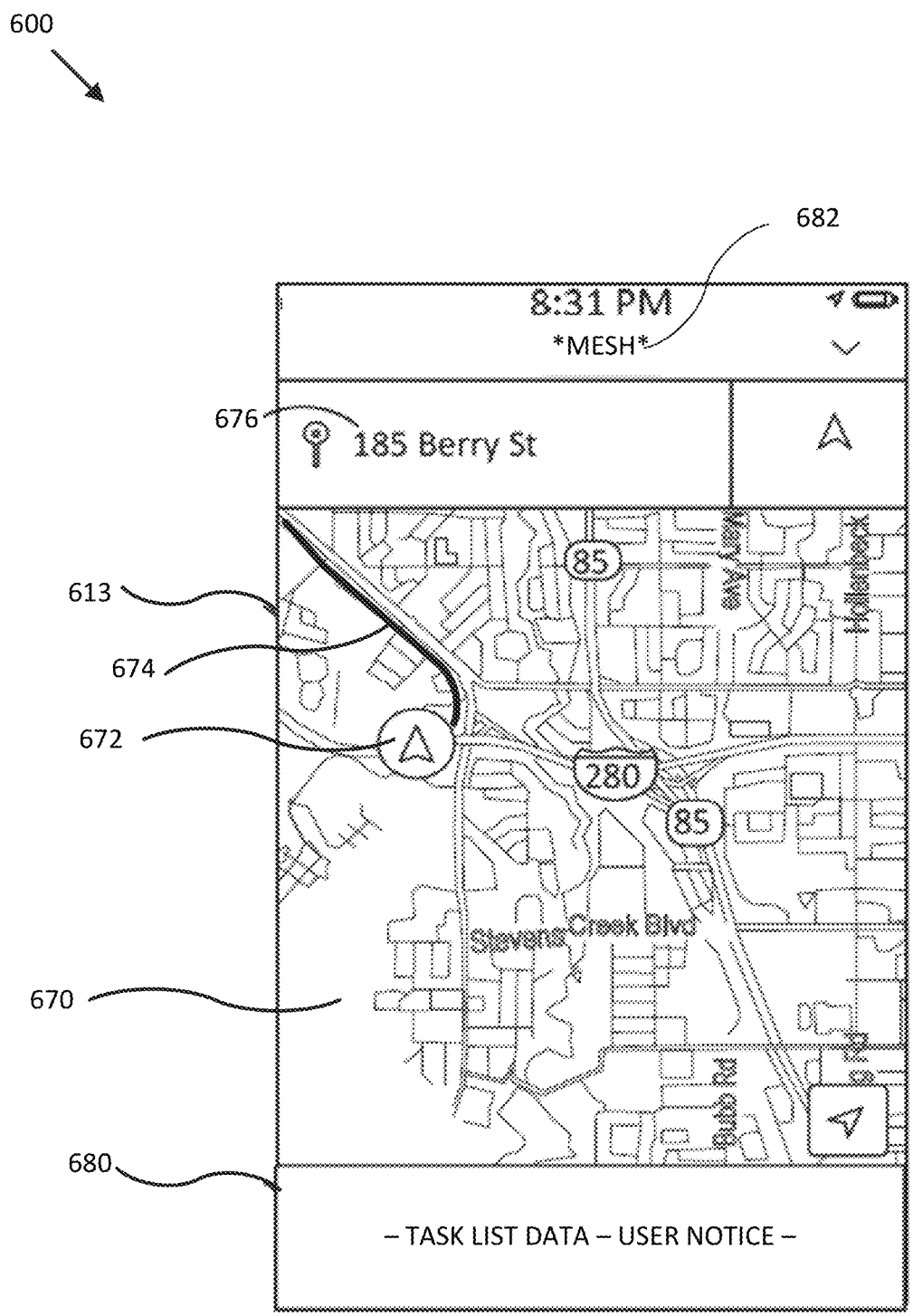
FIG. 6 illustrates a graphical user interface rendered by a display in accordance with an embodiment of the disclosure.

FIG. 6 illustrates a user interface 600 rendered by a display of a user device in accordance with an embodiment of the present disclosure. In the embodiment shown in FIG. 6, user interface 600 corresponds to a navigation assistance rendering within a display border 613 of a display of user interface 600, where user interface 600 includes an underlying street map 670, a present location indicator 672 rendered over street map 670 to indicate a present absolute position of the user device on street map 670, a navigation route indicator 674 rendered over street map 670 to indicate a planned navigation route for completing a task route, and a navigation destination selector/indicator 676 rendered above street map 670 and configured to allow a user to input a desired navigation destination for calculating an optimal navigation route from the current location of the user device to the navigation destination. For example, the optimal navigation route may be a navigation route having a shortest distance between tasks in a task list. In some cases, the optimal navigation route may be determined using Dijkstra's algorithm for determining shortest paths between nodes (e.g., geolocations) in a road network. The optimal navigation route may further be determined based on time of day, real-time traffic conditions, weather, road detours (e.g., reported and/or deduced from real-time traffic analytics), toll roads, urgency of task(s) (e.g., tasks with time budgets that are about to expire may be prioritized in rendering the navigation route), etc. Also shown in user interface 600 is a notice window 680 rendered below street map 670 and a mobile network activity indicator 682. Notice window 680 may be used to render task list data, including user notices and/or alerts, as described herein, for communication to a user (e.g., fleet service technician). Mobile network activity indicator 682 may be configured to indicate to a user when communications are employing mobile mesh network 260 or other networks described herein.

FIGS. 7A-7G illustrate a graphical user interface (GUI) 700 rendered by a display of a user device in accordance with an embodiment of the present disclosure. In the embodiment shown in FIGS. 7A and 7B, GUI 700 includes an underlying task map 718, a present location indicator 701 rendered over task map 718 to indicate a present position of the user device (e.g., computing device) on task map 718, a task route selector/indicator 708 rendered below task map 718 and configured to allow a user to select a desired task route. The task route may be referred to as a task list in some embodiments as the task route may include a list of one or more service tasks to be performed along the task route. The task routes may be categorized according to a type of service task. For example, the task routes may be categorized as a drop off route, battery replacement route, inspection route, replacement route, pick up route, or relocation route. Selection of one or more categories may show task routes belonging to the selected categories. In some embodiments, categories may be selected as user preferences such that task routes associated with certain types of service tasks are shown while task routes not associated with those certain types of service are hidden in user interface 700. In other embodiments, the tasks of the task route may include a combination of one or more types of service tasks. For example, a task route may have a task corresponding to a battery replacement, a task corresponding to a fleet vehicle inspection, and a task corresponding to a fleet vehicle deployment.

Selection of a task route in the task route selector/indicator 708 may cause the selector/indicator 708 to expand from a slim view 710*a* to a more detailed view 710*b* as shown in FIG. 7B. Detailed view 710*b* may include additional details about each of the available task routes shown in task map 718. For example, below each task route in detailed view 710*b*, a number of service tasks corresponding to the task route, an estimated time for completion of the task route, and/or a number of fleet vehicles to be serviced may be displayed.

Graphical icons 705*a*-705*k* may correspond to the task routes in the task route selector/indicator. Graphical icons 705*a*-705*k* may have a numerical indication of the number of service tasks that are to be completed in the corresponding task route. A location of the graphical icon in task map 718 may indicate a starting point for the corresponding task route, an average location for the task route, or an end location for the task route. In various embodiments, task map 718 may display graphical icons corresponding to a defined geographical area. For example, as shown in FIG. 7A, the user device may be configured to show task routes within the geographical area of Ocean Park. Thus, graphical icons may be shown within boundaries of Ocean Park in task map 718 while graphical icons corresponding to task routes outside of Ocean Park may be hidden. In some cases, the graphical icons corresponding to task routes outside the geographic area may be greyed-out, shaded a darker color than non-hidden icons, and/or visually displayed as a different color than the non-hidden icons.

GUI 700 may further include a menu button 702, a re-center button 706, and a previous button 704. Menu button 702 may be activated to access various menu items associated with a user device application such as historical service task information, user profile information, settings, current task routes, messaging, etc. Re-center button 706 may be activated to re-center task map 718 about present location indicator 701. Previous button 704 may be activated to return GUI 700 to a prior window, interface, menu, screen etc.

Figures 7C, 7D:
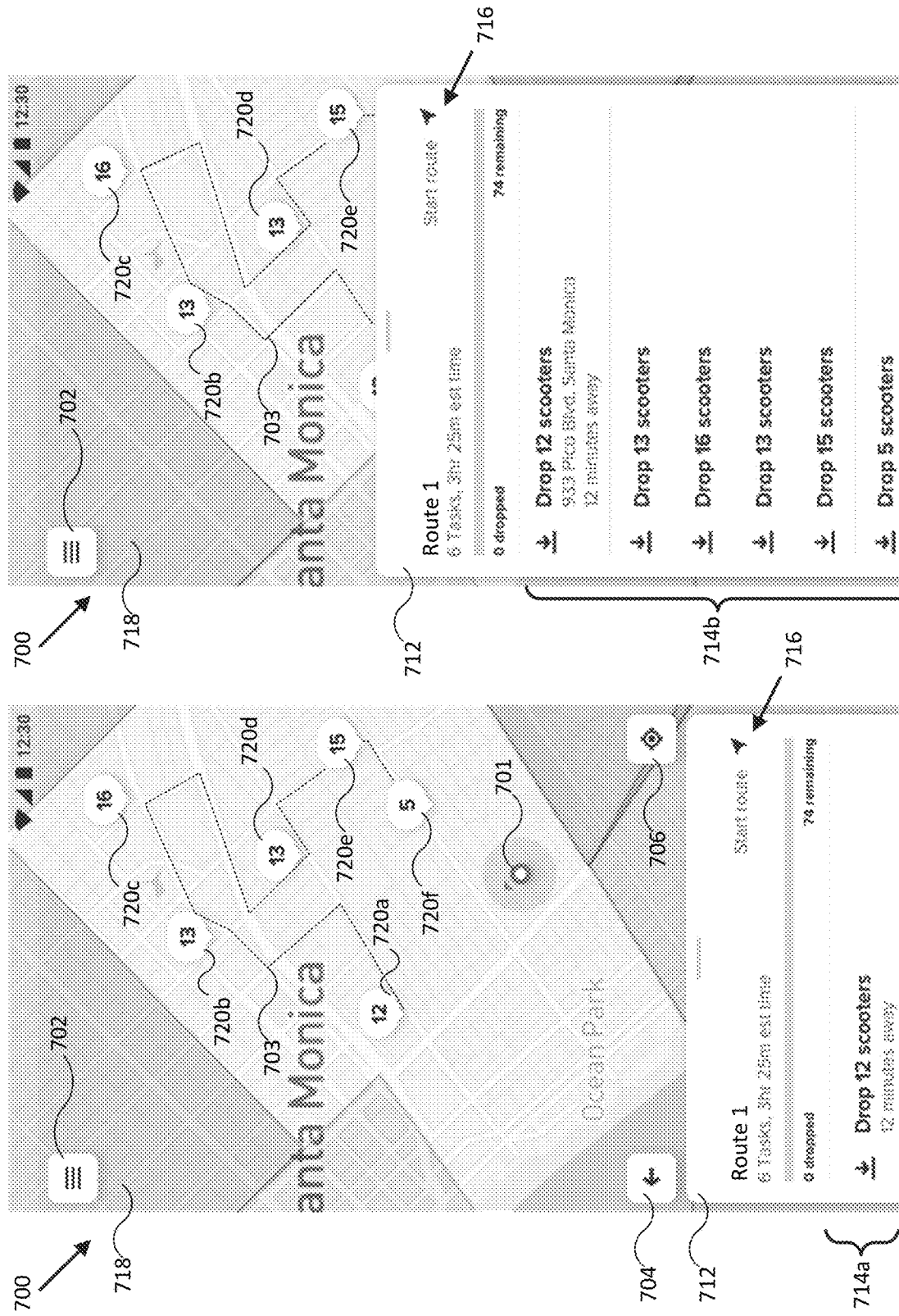

In the embodiment shown in FIGS. 7C and 7D, GUI 700 displays a task route 703. Task route 703 may be displayed in response to Route 1 being selected in task route selector/indicator 708 or may be displayed automatically in response to Route 1 being assigned to a user profile associated with a user device rendering GUI 700. Task route 703 may be displayed in task map 718 as a navigational route having leg routes between adjacent tasks of Route 1. Task route detail 712 may be activated (swiped, clicked, tapped, held, scrolled, etc.) to expand task route detail 712 from a slim view 714*a* to the more detailed view 714*b*. The slim view 714*a* may be minimal in GUI 700 while the more detailed view 714*b* may show additional details for Route 1 such as a service type for each task, a number of fleet vehicles to service for each task, a location corresponding to each task, etc. Displaying minimal details of the route until additional details are requested allows for a user to have a broader view of the task map 718 until the additional details are requested. A user may select start route button 716 provided in GUI 700 to begin the servicing Route 1 and monitor/track progress of service tasks in Route 1.

In the embodiment shown in FIGS. 7E and 7F, GUI 700 displays navigational route 705. Navigational route 705 may indicate a path of navigation beginning with an absolute position corresponding to present location indicator 701 and continuing through each task 720*a*-720*f* in Route 1. For example, navigational route 705 may be displayed after a user selects the start route button 716. As the user proceeds to perform each task of the task route, a graphical icon corresponding to each task along navigational route 705 may be updated. For example, a graphical icon corresponding to tasks 720*a*-*f* may have a color corresponding to a particular task to be performed at the task location. For example, FIGS. 7E and 7F show a graphical icon 728 indicating that at the next task location (task location 720*a*), a user is to drop off 12 scooters. Graphical icon 728 may have a short text indication of the task to be performed and/or a color indicating the task to be performed. For example, graphical icon 728 may read "Drop 12 Scooters" to indicate the task to be performed. Further, graphical icon 728 may be a distinct color to easily determine the task to be performed.

As the user performs each task, a progress task bar 722 may be used to assist the user. For example, the user may select navigation button 724 to receive navigation instructions between task locations. In a further example, the user may select task detail button 726 to update a status of a task. In this regard, as a user performs each task, the user may mark the task as complete, needs review, could not be completed, etc. In some embodiments, progress task bar 722 may include details about an upcoming task such as a type of service to be performed in the upcoming task, location of the upcoming task, and/or estimated time that it will take to arrive at the upcoming task.

Figure 7G:
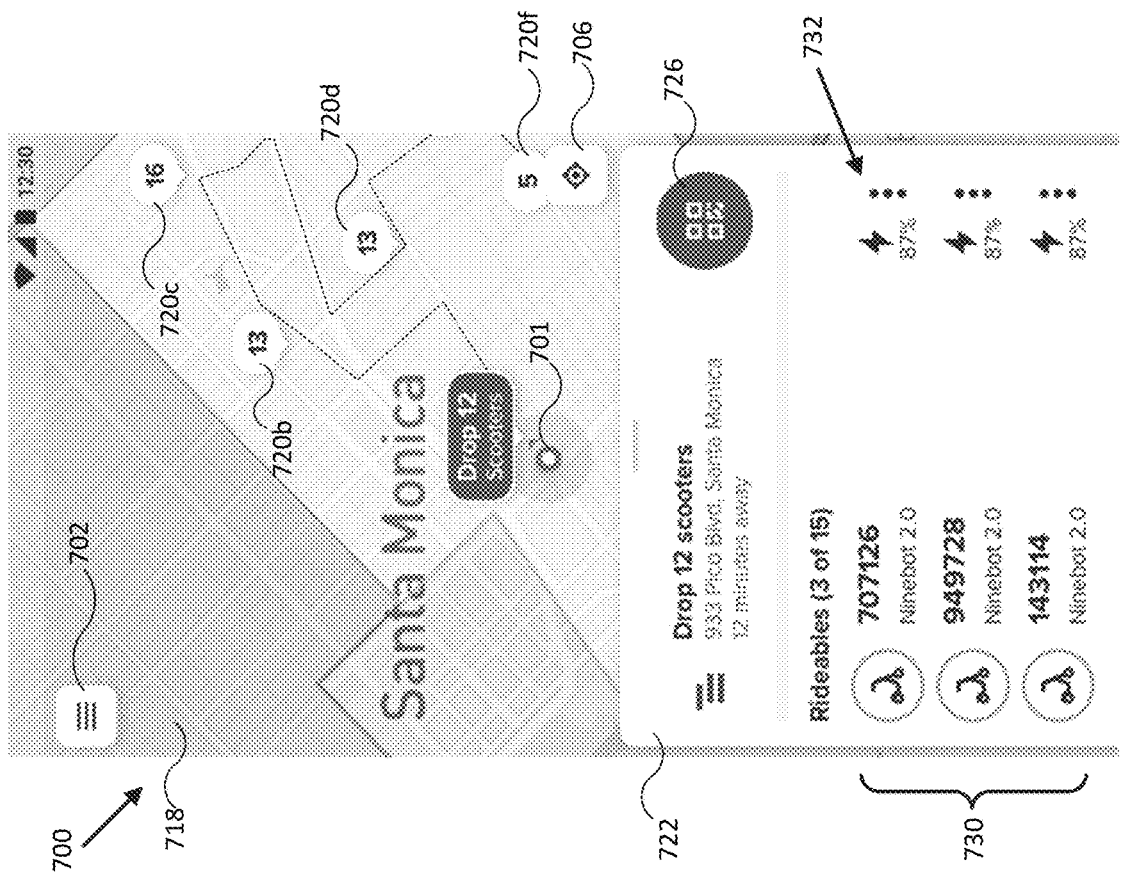

In the embodiment shown in FIG. 7G, GUI 700 displays a detail view 730 of progress task bar 722. Each item in detail view 730 may have details 732. Details 732 may include a battery lives of a fleet vehicles corresponding to a task, fleet vehicle identifiers, a menu selection buttons (depicted as three vertical dots in FIG. 7G), and a number of fleet vehicles to be serviced for the task. In some embodiments, the menu selection button may provide a way to update a status of a particular fleet vehicle. For example, the menu selection button may provide a status update interface to allow a fleet technician to indicate that a particular fleet vehicle's battery has been replaced, the fleet vehicle has been inspected, the fleet vehicle has been deployed/placed/relocated, the fleet vehicle has been serviced (e.g., tires inflated, electrical or mechanical components replaced, serviced, fixed), etc. In some embodiments, the user device may request a service status from a status module of a fleet vehicle that has been serviced. For example, the fleet vehicle may perform a self-diagnosis and communicate a status of the fleet vehicle to the user device. The status may then be transmitted by the user device to a fleet management system. In other embodiments, the status may be reported directly to the fleet management system by the fleet vehicle via one or more networks described herein.

Figure 8:
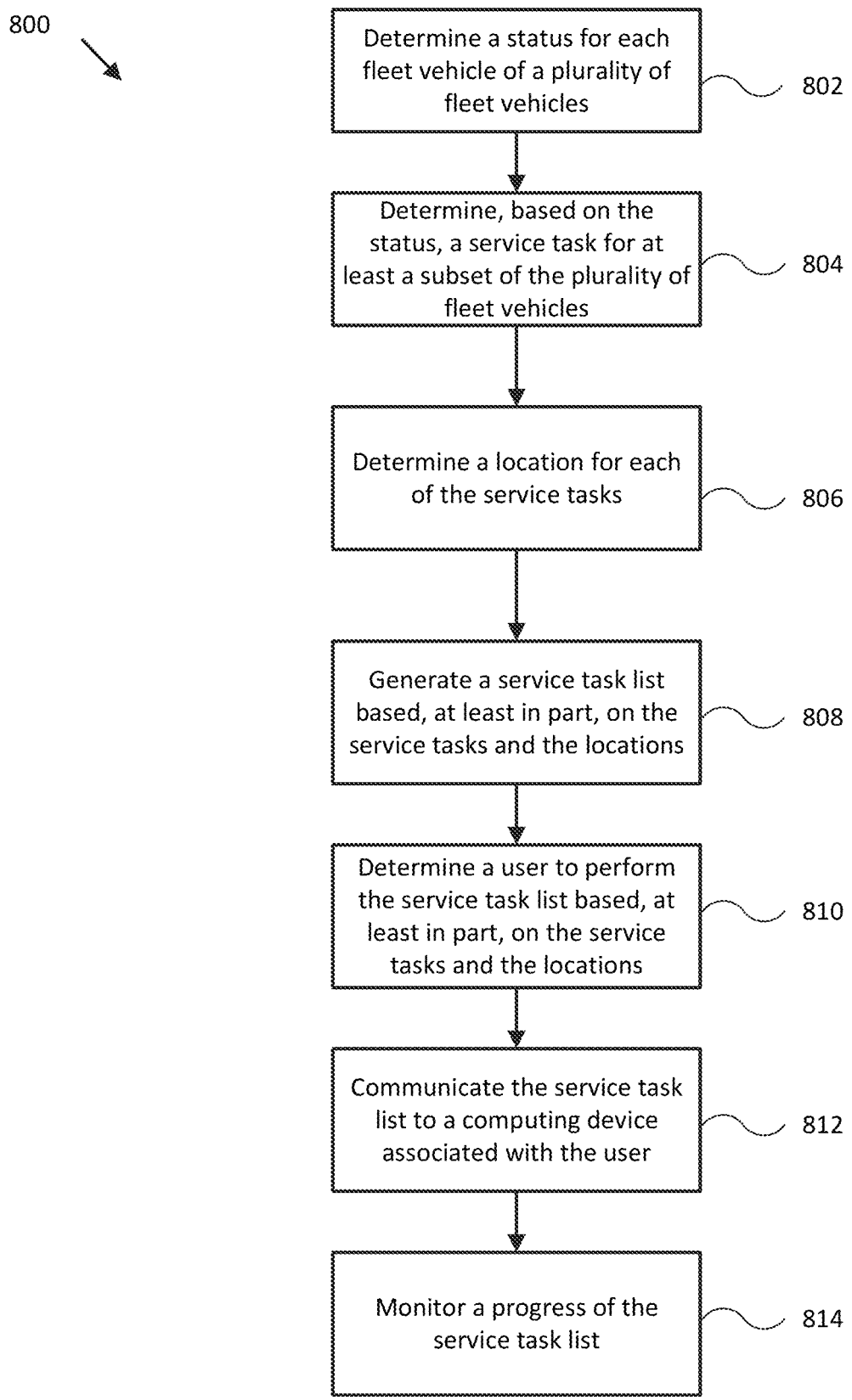
FIG. 8 illustrates a flow diagram of a process for fleet vehicle management in accordance with an embodiment of the disclosure.

FIG. 8 illustrates a flow diagram of a process 800 to manage servicing of fleet vehicles in accordance with an embodiment of the present disclosure. It should be appreciated that any step, sub-step, sub-process, operation, or block of process 800 may be performed in an order or arrangement different from the embodiments illustrated by FIG. 8. For example, in some embodiments, one or more blocks may be omitted from or added to the process. Furthermore, block inputs, block outputs, various sensor signals, sensor information, calibration parameters, location information, task related information, and/or other operational information/parameters may be stored to one or more memories prior to moving to a following portion of a corresponding process. Although process 800 is described with reference to systems, devices, and processes described in reference to FIGS. 1-7G and 10A-11, process 800 may be performed by other systems, devices, and processes different from those systems, devices, and processes including a different selection of electronic devices, sensors, assemblies, mobile structures, and/or mobile structure attributes, for example.

In block 802, a system determines a status for each fleet vehicle of a plurality of fleet vehicles. For example, a status may be one or more of active (e.g., currently being operated), inactive (e.g., not deployed for operation), standby (e.g., deployed but not being currently operated), requires inspection, requires replacing a battery or other electrical/mechanical component, requires retrieval and/or replacement of the fleet vehicle, and/or requires relocation/deployment of the fleet vehicle to a new location. In some instances, the status may be extracted from a status report received from the fleet vehicle. For example, a status module of other modules 126 may gather information from various sensors coupled to mechanical and/or electrical components of fleet vehicle 110 to evaluate and determine a status report for fleet vehicle 110. The status report may be communicated to the system directly via a network or indirectly via a user device acting as a proxy communication pathway (e.g., via a mobile mesh network). As an example, the status report may indicate a battery charge remaining in a battery of the fleet vehicle. If the battery charge is below a threshold, the system may determine a status of battery replacement for the fleet vehicle.

In some instances, the status for one or more fleet vehicles may be determined according to machine learning models providing recommendations. For example, one or more machine learning models may provide recommendations as to when and where to move certain fleet vehicles. The machine learning models may be trained based, at least in part, on training datasets having historical information related to fleet vehicle use. For example, the training datasets may include data related to a number of rides for a defined location over a period of time, historic weather conditions for the defined location over a period of time, special events (such as a specific recurring yearly conference) happening at a certain location during a certain time period, and/or a number of user sessions (e.g., opening/executing a rideshare application) for a defined location over time. In some embodiments, defined locations may be predefined geographical locations within an urban environment.

The training datasets may be continuously updated with new training data that may be used for further training of the machine learning models. Based on the training datasets, the machine learning models may be iteratively trained to predict a demand for defined locations. The demand may be a numeric score representing an expected number of uses/rides of the fleet vehicle over a predefined period of time assuming a fleet vehicle is always available at a particular location (e.g., a demand score of 8 may, for example, represent that 8 uses/rides are expected over 1 hour in the predefined location). A use may be an actual use of the fleet vehicle and/or a user session in which a user opens a rideshare application to search for a nearby fleet vehicle, for example. Predicted use may also include how many fleet vehicles may be dropped off near the location and/or how many fleet vehicles may be leaving the location, which allows the fleet vehicle management system to determine a net increase or decrease of available fleet vehicles at any particular time at the location. Based on the predicted demand, a recommendation may be made by the machine learning models to change a status of the fleet vehicle to include a status corresponding to relocation or deployment of the fleet vehicle to a location within the predefined location. The system may determine a status of the fleet vehicle based on the recommended status change.

To illustrate, a fleet vehicle may be located in a first location. The machine learning model may predict that a second location has a fleet vehicle demand that is greater than a fleet vehicle demand of the first location. Thus, the machine learning model may recommend that a status of the fleet vehicle be changed to include a relocation request from the first location to the second location. The system may automatically change the fleet vehicle status indicating that a relocation is requested based on the model recommendation in some cases.

Figure 11:
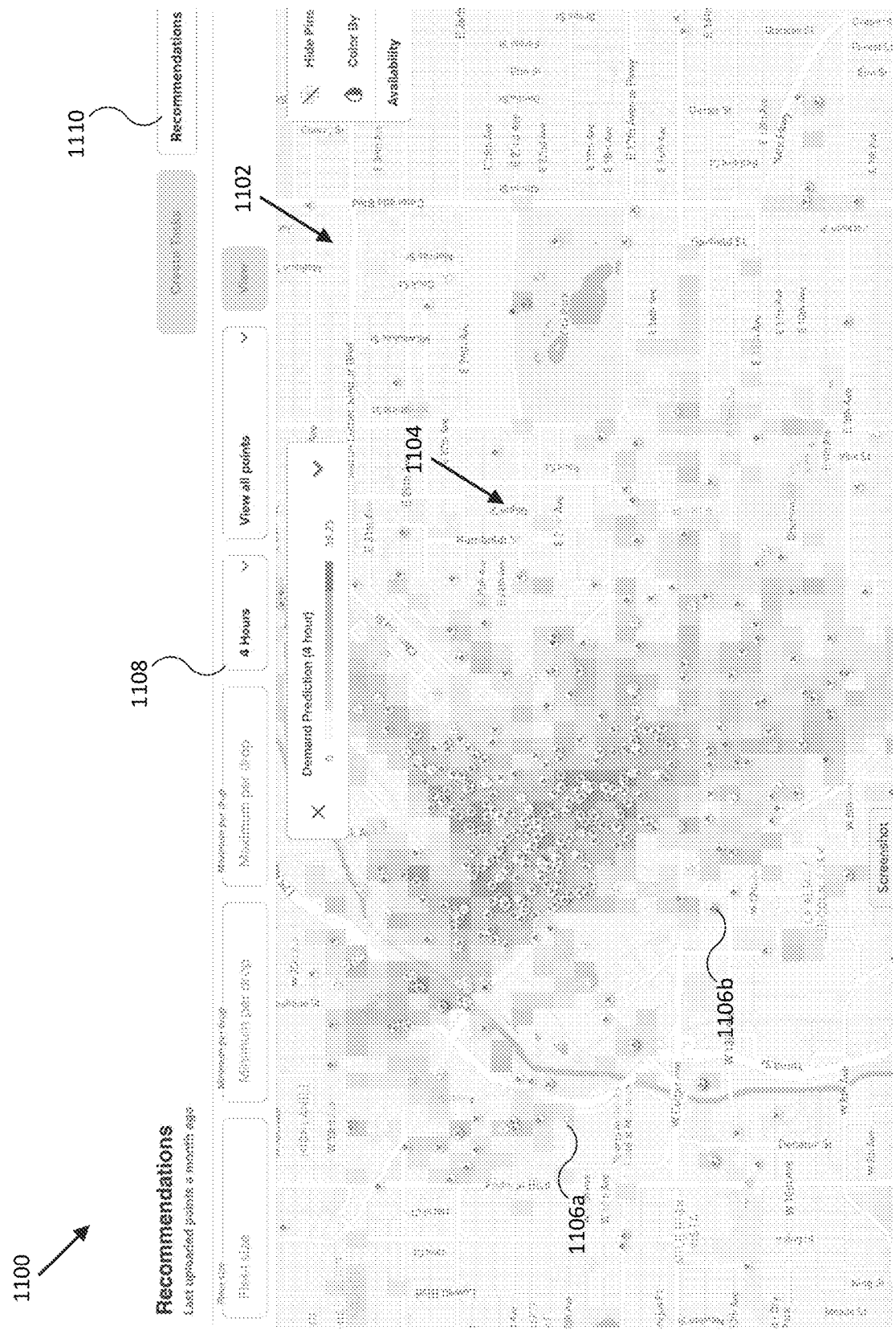
FIG. 11 illustrates a graphical user interface rendered by a display in accordance with an embodiment of the disclosure.

Demand scores may be visually represented in a shading matrix on a map in a graphical user interface such as GUI 1100 of FIG. 11.

In another example, machine learning models may provide recommendations as to when to recharge or replace a battery for a fleet vehicle. For example, machine learning models may be trained based, at least in part, on training datasets including information related to number of rides during a period of time, battery drainage associated with the rides, the type of rides (many inclines vs. flat or decline roads, constant moderate speed vs. many stops and starts with high accelerations and speeds) and weight carried by the vehicle (rider(s) plus any additional weight they are carrying, such as backpacks or groceries). The machine learning models may be able to predict that a fleet vehicle does not have sufficient battery charge for a certain time of day. Thus, the machine learning model may recommend that the status of the fleet vehicle be changed to a status indicating a request for battery replacement.

To illustrate, a fleet vehicle may have a first status indicating a battery percentage of 55% at 4 o'clock in the evening at a particular location. The machine learning model may use this information to predict that the fleet vehicle does not have a sufficient battery charge for the 4 o'clock time. For example, based on historic data, the machine learning model may predict that at 5 o'clock, demand for the fleet vehicle may increase and a number of rides of the fleet vehicle may increase for the particular location. In other words, although under other time periods throughout the day, 55% may be a sufficient battery charge, at 4 o'clock, 55% may be considered an insufficient battery charge because demand and use may increase exponentially at 5 o'clock as users are searching for rides after work, for example Thus, the machine learning model may recommend that the status of the fleet vehicle be changed from the first status to a second status that indicates that a battery replacement is requested. In some cases, the system may automatically change the fleet vehicle status based on the recommendation.

In block 804, the system determines a service task for at least a subset of the plurality of fleet vehicles. The service task for each fleet vehicle of the subset may be determined based on the status corresponding to the fleet vehicle determined in block 802. For example, a fleet vehicle may have a status indicating a battery charge that is below a predetermined threshold. Based on the battery charge being below the predetermined threshold, a battery pack replacement service task may be determined for the fleet vehicle. In another example, the fleet vehicle may have a hardware and/or software component malfunction or damage. Based on the hardware and/or software component malfunction or damage, an inspection and/or replacement service task of the fleet vehicle may be determined. In another example, the fleet vehicle may be located at an absolute position that is outside of a predetermined geographical area to which the fleet vehicle is assigned (e.g., a user rode the fleet vehicle outside the bounds of the geographical area to which the fleet vehicle was assigned). Based on the fleet vehicle location being located outside of the predetermined geographical area, a retrieval and/or relocation service task may be determined. In some cases, the machine learning recommendations regarding status as described above may be employed in determining the service task for the fleet vehicle.

In block 806, the system determines a location for each of the service tasks. In some embodiments, the location of the service task may be determined based on an absolute position of the fleet vehicle. For example, the fleet vehicle may communicate to the system an absolute position of the fleet vehicle via one or more networks discussed above. To illustrate, a fleet vehicle requiring a battery replacement may have a service task location of an absolute position of the fleet vehicle location as a fleet technician may need to travel to the fleet vehicle to replace its battery. To illustrate further, a fleet vehicle requiring an inspection may have a service task location of an absolute position of the fleet vehicle. To illustrate further, a fleet vehicle requiring a retrieval may have a service task location of an absolute position of the fleet vehicle.

In various embodiments, the service task location may be a location corresponding to deployment or relocation of the fleet vehicle (e.g., a drop off location). According to some embodiments, the deployment location may automatically be determined based on machine learning model outputs.

For example, one or more machine learning models may be trained using training datasets including user ride history data aggregated from a number of fleet vehicle users/user accounts. The user ride history may provide data related to rides including time of day for rides, length of time for rides, number of rides over periods of time (e.g., certain days, weeks, months, year, hours, minutes, etc.) in particular geographic locations, travel routes for rides including a beginning position, intermediate positions, and final position, and user sessions (e.g., opening a rideshare mobile application to search for a fleet vehicle) including locations of the user sessions. The training datasets may further include weather history over a past period of time such as a number of rainy days over the past year, for example.

Based on the training datasets and training steps performed to train the machine learning models, the machine learning models may predict a user demand corresponding to a location. Such locations may automatically be assigned as deployment locations to service tasks. As an illustrative example, the system may determine that a location is currently absent of fleet vehicles. The system may determine a demand score for the location. If the predicted demand score is greater than a predetermined threshold, the system may determine that the location is to be assigned a location for a deployment service task. The system may further automatically assign the location to a deployment service task.

In some embodiments, a determination is made as to whether the demand score is negated by a cost-benefit score. For example, a cost-benefit score for the location currently absent of fleet vehicles may be determined by, for example, determining a distance between a closest service technician and the location currently absent of fleet vehicles. If a cost to travel the distance is greater than the monetary benefit expected to be received if a fleet vehicle was deployed in the location based on the demand score, then the location may not be assigned to a deployment service task location.

In block 808, the system generates a service task list. In some embodiments, the service task list may be generated based, at least in part, on the service tasks and locations. For example, the service task list may include tasks that are a particular type of task (e.g., battery replacement, inspection, relocation, retrieval, replacement, deployment etc.). In other examples, the service task list may include tasks from a combination of different service types. In some cases, the service task list may be arranged such that adjacent tasks provide for an efficient navigation route. For example, the service task list may be arranged to minimize travel distance to complete the service tasks and/or minimize one or more individual distances between adjacent tasks.

For example, the navigation route may be determined using one or more pathfinding algorithms. For example, A-star (A*) search algorithm, Anytime A*, Anytime Dynamic A*, Block A*, D*, Field D*, Fringe, Fringe Saving A*, Generalized Adaptive A*, Incremental heuristic search, informational search, iterative deepening A*, Jump point search, Lifelong Planning A*, New Bidirectional A*, Simplified Memory bounded A*, Realtime A*, Theta*, Time-Bounded A*, Dijkstra's algorithm, and/or combinations and/or variations thereof may be used to determine an efficient navigation route. Various other pathfinding algorithms may be used in some embodiments to achieve a desired implementation of an embodiment.

The navigation route may further be determined based on real-time traffic updates. For example, a road congested with vehicles or people (e.g., determined via geolocation data gathered from user devices in the vehicles or on the people) may be a factor in determining the navigation route. The navigation route may further be determined based on real-time weather updates. For example, wind direction and speed may be used to determine which street to use in the navigation route to optimize time and fuel efficiency. In this regard, the system may determine real-time weather updates by collecting sensor data from one or more sensors of the plurality of fleet vehicles. In other cases, real-time weather data may be retrieved via Application Programming Interface (API) calls to a weather data aggregation service provider. Further, road conditions may also factor in determining a navigation route, such as areas under construction, closed for a specific reason, and damaged roads (which may damage the fleet vehicle).

In block 810, the system determines a user to perform the service task list. In some embodiments, the user is determined based, at least in part, on the service tasks and the locations. For example, a user may be assigned to certain service tasks such as battery replacements according to a user profile designation. For example, the user profile may be designated as a battery replacement specialist. Thus, if the service task list includes battery replacement service tasks, the system may determine that the user having a battery replacement specialty is to be assigned to perform the service task list.

In some embodiments, a user location is determined and used in determining that the user is to perform the service task list. For example, the user location may be within a predetermined distance from a task location in the service task list. For example, the user may be a closest user of a plurality of users in proximity to the task location. As another example, the user may be a closest user to an optimal beginning task location in the service task list according to an optimal navigational route. In such cases, the user may be determined to be the user to perform the service task list. In some embodiments, the system first looks at closest users and then determines whether those closest users are qualified to perform the service task. If none are available or meet criteria, the geofence around the service location can be expanded to find qualified users. This can continue until the desired number of users is found.

In various embodiments, when a user is determined, the user location may be used to rearrange the navigation route. For example, a user may be closer to the final service task location. Thus, the system may rearrange the navigation route to begin from what was the final service task location. The other service task location may be arranged as well to provide for an efficient navigation route beginning from what was the final service task location.

In some embodiments, where there are multiple users within a predefined distance from a beginning task location, priority may be given to users that have designated specialties that coincide with types of tasks in the task list. For example, if a service task list has a majority of battery replacement tasks, a user that has a designated battery replacement specialty may be assigned to the task list even though another user may be closer to the beginning task location.

According to some embodiments, the system may send periodic queries to users to determine user location and availability to be perform service task lists. In some cases, service task lists may be split to optimize time efficiency. For example, the system may determine that two or more users are available to perform the service task list (e.g., within proximity of the service task locations). The system may split the service task list into constituent task lists that can be performed by the different users who are available to perform the constituent service task list. For example, a service task list with 12 tasks may be split into 3 service task lists and allocated to three different users.

In block 812, the system communicates the service task list to a computing device associated with the user determined in block 810. In some embodiments, the service task list may cause one or more GUI elements to display in the computing device. For example, the communication may cause one or more of the display elements and processes/operations discussed in reference to FIGS. 7A-7F to be executed.

In block 814, the system monitors a progress of the service task list. For example, the service task lists may be updated with status updates corresponding to the service tasks. The status updates may be retrieved from the fleet vehicles. For example, a fleet vehicle may communicate to the system that a low-charge battery has been replaced with a fully-charged battery. In another example, the fleet vehicle may transmit its location as it moves from an initial location to the task location. The fleet vehicle location may be tracked to determine that the fleet vehicle has been relocated/deployed at the task location by matching the fleet vehicle location to the task location. In some cases, when the fleet vehicle location matches the task location, the progress of the service task list may be updated to indicate that the service task has been completed.

In some embodiments, the progress may be updated with communications received from the computing device of a user performing a service task. For instance, the fleet vehicle may communicate a status update to the computing device and the computing device may communicate the status update to the system. In some cases, a user may input a status update into computing device to be transmitted to the system as the user performs and completes each task.

According to one or more embodiments, the system may verify that the location of the computing device is within a predefined threshold distance away from the task location before updating the status of the task in the task list progress. For example, a user may communicate via a computing device that a task has been completed by the user. In response to the task completion communication, the system may verify such by comparing a location of the computing device to a location of the task. Completion of the task may be verified if the location of the computing device is within a predetermined threshold distance from the task location.

In various embodiments, user interface 400 of FIG. 4 may be updated based on the monitored progress. For example, status indicators may be updated based on the monitored progress and task status updates. In some embodiments, a route indicator may be updated to display a shorter route as tasks become completed indicating a remaining route to complete remaining tasks. In some cases, the route indicator may be updated to re-route a user after a user has strayed away from a planned or original route for the task list. Graphical icons along the route indicator may be updated corresponding to various task status updates. For example, graphical icons may be displayed as a "green" color to indicate completed tasks or as a "white" color to indicate non-completed tasks. Various different colors corresponding to different task statuses may be implemented according to other embodiments.

Figure 9:
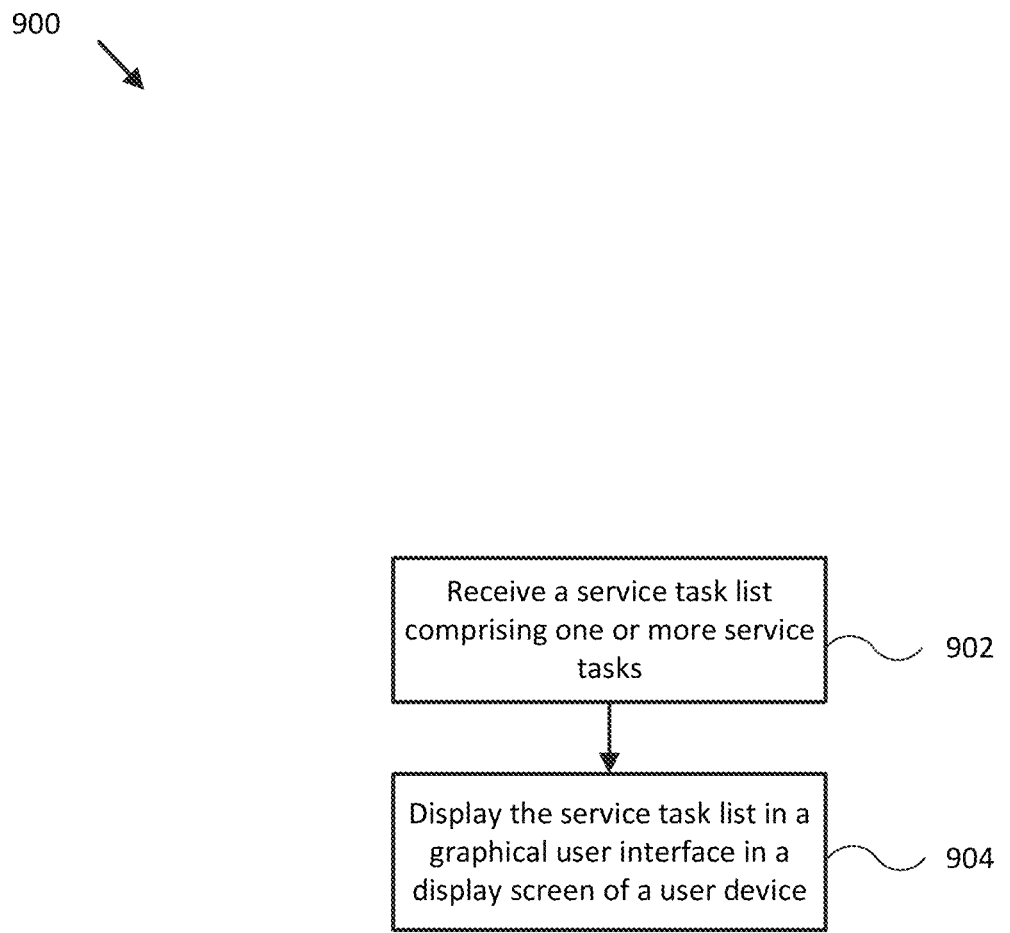
FIG. 9 illustrates a flow diagram of a process for fleet vehicle management in accordance with an embodiment of the disclosure.

FIG. 9 illustrates a flow diagram of a process 900 for servicing fleet vehicles in accordance with an embodiment of the present disclosure. It should be appreciated that any step, sub-step, sub-process, operation, or block of process 900 may be performed in an order or arrangement different from the embodiments illustrated by FIG. 9. For example, in some embodiments, one or more blocks may be omitted from or added to the process. Furthermore, block inputs, block outputs, various sensor signals, sensor information, calibration parameters, location information, task related information, and/or other operational information/parameters may be stored to one or more memories prior to moving to a following portion of a corresponding process. Although process 900 is described with reference to systems, devices, and processes described in reference to FIGS. 1-7G, process 900 may be performed by other systems, devices, and processes different from those systems, devices, and processes including a different selection of electronic devices, sensors, assemblies, mobile structures, and/or mobile structure attributes, for example. In some embodiments, process 900 may include one or more of the operations described in reference to process 800.

In block 902, a user device receives a service task list comprising one or more service tasks. In some embodiments, the user device may determine a location of the user device. Based on the location of the user device, the user device may rearrange an order of service tasks in the service task list. For example, if a user device location is closer to a service task location that is not a beginning task in an order of the service task list, the service task list may be rearranged such that the service task locations are formatted in a navigationally efficient order. For example, the service task list may be rearranged such that travel distance or travel time is minimized or service tasks having urgent deadlines are prioritized. For example, urgent deadlines may be determined based on a battery status (e.g., battery below 10% charge), a tire pressure (e.g., deflated 10% of functional pressure), deployment at a particular location before a rush hour at the location (e.g., fleet vehicle must be relocated/deployed before a time of day).

In block 904, the user device displays the service task list in a graphical user interface in a display screen of the user device. In one or more embodiments, the service task list may be displayed as a task map having a task route indicator.

The task route indicator may have route legs configured to indicate navigational routes between adjacent service tasks in the service task list.

In some embodiments, the service task list may be configured to be displayed having a graphical progress indicator that indicates a remaining number of incomplete service tasks of the service task list. According to some embodiments, the user device may receive a status update for each fleet vehicle associated with one or more service tasks in the service task list and update the service task list based on the status updates. For example, a user may perform a battery replacement on a fleet vehicle. The fleet vehicle may generate a status report and transmit the status report to the user device to indicate that the a low-charge battery of the fleet vehicle has been replaced with a fully-charged battery. In response to receiving the status report, the user device may update that service task associated with replacing the battery on the fleet vehicle from an incomplete status to a completed status.

According to some embodiments, one or more GUI elements and display operations described in reference to FIGS. 6-7G may be implemented in process 900.

Figure 10A:
FIGS. 10A and 10B illustrate a graphical user interface rendered by a display in accordance with an embodiment of the disclosure.
Figure 10B:
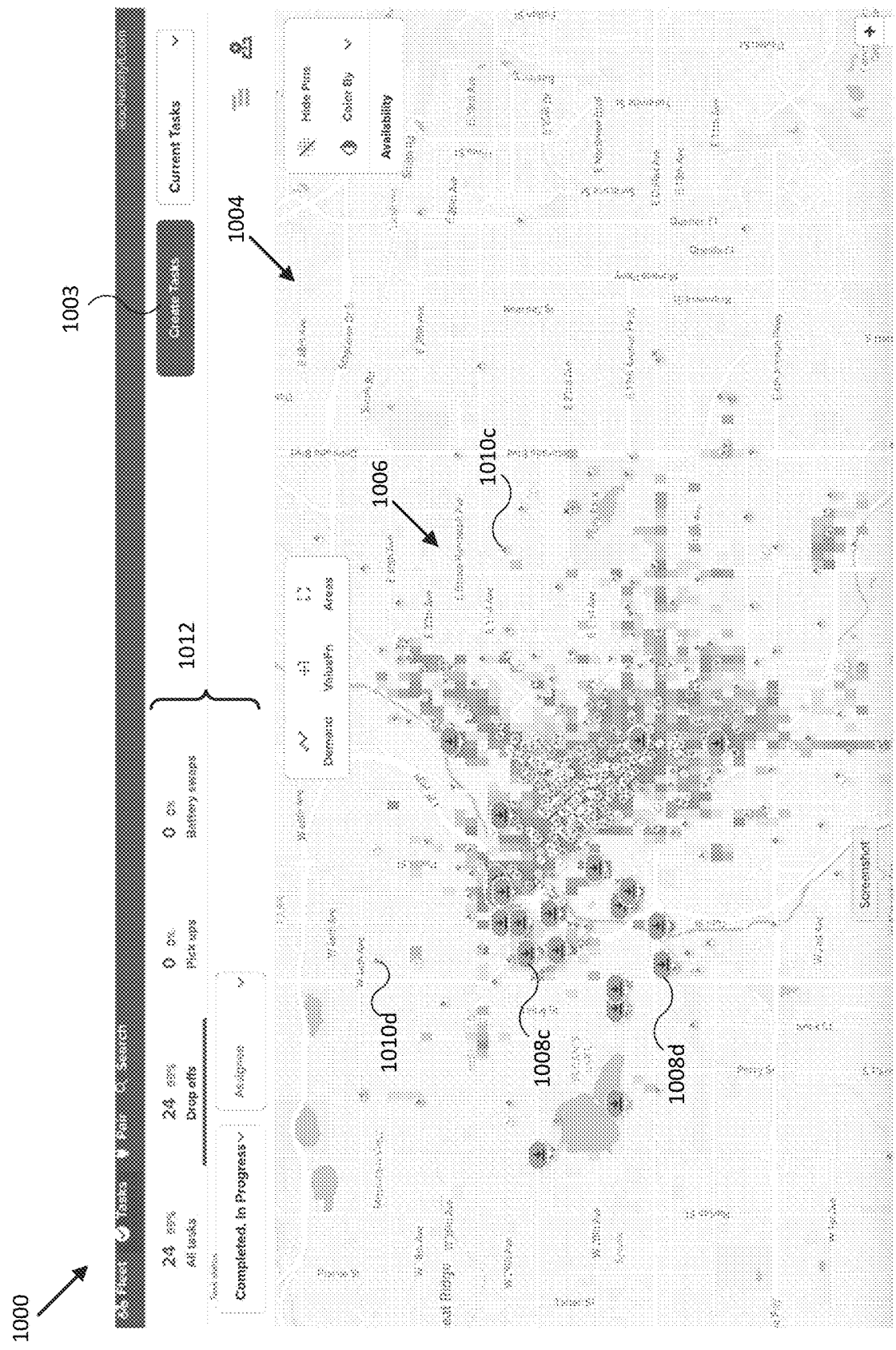

FIGS. 10A and 10B illustrates a graphical user interface (GUI) 1000 rendered by a display of a user device in accordance with an embodiment of the present disclosure. In the embodiment shown in FIG. 10A, GUI 1000 includes input fields 1002, an underlying map 1004, a shading matrix 1006 rendered over a map 1004 to represent relative values associated with locations on map 1004, task status indicators (e.g., 1008a-1008d) configured to indicate to a user a current status of a task corresponding to a certain location on the map 1004, fleet vehicle location indicators (e.g., 1010a-1010d) configured to indicate a current location of a fleet vehicle, and create tasks button 1003. In the embodiment shown in FIG. 10B, GUI 1000 may include a task list progress graphical indicator 1012, which may show a number of tasks (e.g., drop-offs, pick-ups, battery swaps) that are in progress and a current percentage of completion. In some embodiments, task status indicators may change colors to indicate the current status of the corresponding task. In some embodiments, the fleet vehicle location indicators may change color according to a real-time battery status of the fleet vehicle. For example, the fleet vehicle location indicator may be a "red" color to indicate a low-level battery charge, a "yellow" indicator to indicate a medium-level battery charge, and a "green" color to indicate a high-level battery charge. Various thresholds may be used to determine the color indicators and associated level of battery charge. For example, 0% through 20% may correspond to the low-level battery charge, 21% through 80% may correspond to the medium level battery charge, and 81% through 100% may correspond to the high-level battery charge.

In various embodiments, the shading matrix 1006 may indicate a value associated with a location on map 1004. For example, a darker shade may have a higher value and a lighter shade may have a lower value. The value may be a score that is determined based on a demand for that location and the number of fleet vehicles currently present in that location. For example, a high demand score and a low number of fleet vehicles for a location may equate to a higher value score and a darker shade in the shading matrix 1006. A lower demand score and a high number of fleet vehicles present in a location may equate to a lower value score and a lighter shade in the shading matrix 1006. Using shading matrix 1006, a user may be able to easily view where fleet vehicles should be deployed and consequently where to create new service tasks (e.g., drop-off, relocation, deployment).

The value score may further be determined based on input constraints such as inputs provided to input fields 1002. For example, a fleet size, minimum fleet vehicle per drop, maximum fleet vehicle per drop, and a time duration may be used in calculating a value score. For example, a location may have a high demand, low number of currently present fleet vehicles, but the constraints only allow for 2 fleet vehicles to be dropped. In such an example, another location with a medium demand and zero currently present fleet vehicles may be determined to have a higher value score based on the constraints since the other location would benefit more from having just 2 fleet vehicles over having zero.

FIG. 11 illustrates a graphical user interface (GUI) 1000 rendered by a display of a user device in accordance with an embodiment of the present disclosure. In the embodiment shown in FIG. 11, GUI 1100 includes input field/selector 1108, an underlying map 1102, a shading matrix 1104 rendered over map 1102 to represent relative values associated with locations on map 1102, fleet vehicle location indicators (e.g., 1106a and 1106b) configured to indicate a current location of a fleet vehicle, and recommendation button 1110. In some embodiments, recommendation button 1110 may be activated (e.g., clicked, pressed, touched) to display a list of recommended service tasks. In some cases, the service tasks may be recommendations generated by machine learning algorithms discussed above. The recommendations may be updated in real-time according to current demand, fleet vehicle positions, fleet vehicle statuses, service technician device locations, time of day, day of week, and/or weather. The recommendations may be generated based on training datasets including historic information for demand, fleet vehicle positions, fleet vehicle statuses, service technician device locations, time of day, day of week, weather, and/or fleet vehicle use for a particular location. In various embodiments, the recommendations may be adjusted based on a cost-benefit analysis. For example, if a deployment task costa more in gas and/or fees/compensation than an expected benefit of deploying a fleet vehicle in a particular location, then the recommendation system may abstain from recommending the service task or provide an analysis in GUI 1100 for review for a user to make a determination as to whether to create the service task.

In various embodiments, the shading matrix 1104 may indicate a score associated with demand for fleet vehicles for locations on map 1102. For example, a darker shade may have a higher demand score and a lighter shade may have a lower demand score. The demand score may represent a calculated demand for fleet vehicles at a particular location assuming that a fleet vehicle is available. For example, a demand score of 4 may mean that 4 fleet vehicles are expected to be used for that location. The demand score may further be refined based on input field/selector 1108. For example, input field/selector may include a timeframe. The demand score may be calculated based on the timeframe. For example, a timeframe of 4 hours may be used to calculate a demand score for a location over the next 4-hour timeframe. In various embodiments, the timeframe may be selected to be a certain day of week and/or certain time of day. For example, input field/selector 1108 may have an input of "Friday" at "4:00 PM to 6:00 PM." Thus, the demand score in that case will correspond to a predicted demand for a time corresponding to the inputted timeframe.

As discussed above, the demand score may be predicted based on machine learning algorithms trained using historic data.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for managing servicing of a plurality of fleet vehicles comprising:
   determining, based on sensor data from each of the plurality of fleet vehicles, a status for each of the plurality of fleet vehicles;
   determining, based on the status, service tasks for at least a subset of the plurality of fleet vehicles;
   determining a location for each of the service tasks;
   determining a time budget allotted to complete each of the service tasks;
   generating a service task list based, at least in part, on the service tasks, the locations, and the time budgets, wherein the service tasks in the service task list are ordered based, at least in part, on the locations and the time budgets;
   determining a user to perform the service task list based, at least in part, on the service tasks, the locations, and a user profile associated with the user, wherein the user profile includes a user specialty associated with performing a type of fleet vehicle service;
   sending wireless instructions to display the service task list on a computing device associated with the user;
   receiving a user input from the computing device, wherein the user input indicates a selection by the user of the service tasks in the service task list; and
   monitoring a progress of the selected service tasks in the service task list.

2. The method of claim 1, further comprising:
   determining a location of the computing device, wherein the generating the service task list is further based on the location of the computing device.

3. The method of claim 1, further comprising:
   receiving from the computing device a partial acceptance of the service task list, wherein the partial acceptance is an acceptance of less than all of a total number of service tasks in the service task list; and
   updating the service task list based on the partial acceptance of the service task list.

4. The method of claim 1, wherein the monitoring the progress of the selected service tasks in the service task list comprises:
   receiving a status update for each fleet vehicle of the subset of the plurality of fleet vehicles; and
   updating the progress based, at least in part, on the status updates.

5. The method of claim 1, wherein the location corresponds to a location of a fleet vehicle, and wherein the service task comprises one or more of a type of fleet vehicle, the type of fleet vehicle service, and a fleet vehicle identifier.

6. The method of claim 1, wherein the type of fleet vehicle service comprises one or more of a fleet vehicle inspection, a fleet vehicle battery replacement, a fleet vehicle retrieval, a fleet vehicle relocation, or a fleet vehicle delivery.

7. The method of claim 1, wherein the service task list comprises a task map indicating the location of each service task in the service task list, and wherein each location is marked by a task status icon in the task map.

8. The method of claim 7, wherein the task map includes a task route indicator comprising at least one route leg configured to indicate a route between adjacent service tasks of the service task list.

9. The method of claim 1, wherein the time budget is determined based on one or more of a target time to complete the service task, a historic time recorded for the service task, or an estimated time until the location for the service task is reached.

10. The method of claim 1, wherein the service tasks in the service task list are ordered such that the service tasks with shorter time budgets are prioritized.

11. The method of claim 1, wherein the service tasks in the service task list are ordered such that a distance between adjacent service tasks in the service task list is minimized.

12. The method of claim 1, wherein the progress of the selected service tasks in the service task list is monitored based on received status updates from (a) one or more of the subset of the plurality of fleet vehicles associated with the selected service tasks or (b) additional user inputs received from the computing device.

13. A method for servicing of a plurality of fleet vehicles comprising:
   receiving a service task list comprising one or more service tasks, a location for each of the service tasks, and a time budget allotted to complete each of the service tasks, wherein an order of the service tasks in the service task list is arranged based, at least in part, on the locations and the time budgets;
   displaying the service task list in a graphical user interface in a display screen of a user device associated with a user, wherein the user is determined based, at least in part, on a user profile associated with the user, and wherein the user profile includes a user specialty associated with performing a type of service of the task; and
   receiving a user input from the user device, wherein the user input indicates a selection by the user of the service tasks in the service task list.

14. The method of claim 13, further comprising:
   determining a location of the user device; and
   rearranging the order of service tasks in the service task list based, at least in part, on the location of the user device.

15. The method of claim 14, further comprising:
generating a task map having a task route indicator, wherein the task route indicator comprises at least one route leg configured to indicate a navigational route between adjacent service tasks in the service task list; and displaying the task map in the graphical user interface.

16. The method of claim 13, wherein the displaying the service task list in the graphical user interface comprises displaying a graphical progress indicator that indicates a remaining number of incomplete service tasks of the service task list.

17. The method of claim 13, wherein each service task comprises a type of fleet vehicle associated with the task, the type of service of the task, or a fleet vehicle identifier corresponding to a fleet vehicle associated with the task.

18. The method of claim 13, wherein the type of service of the task comprises one or more of an inspection of the fleet vehicle, a battery replacement of the fleet vehicle, a retrieval of the fleet vehicle, a drop-off of the fleet vehicle, a replacement of the fleet vehicle, or no service currently needed for the fleet vehicle.

19. The method of claim 13, further comprising:
receiving a status update for each fleet vehicle associated with one or more service tasks in the service task list; and updating the service task list based on the status updates.

20. The method of claim 13, wherein the service task list comprises a task status indicator corresponding to each service task in the service task list, and wherein the method further comprises updating the task status indicator as a corresponding service task is completed.

* * * * *